(12) United States Patent
Clement et al.

(10) Patent No.: US 9,288,836 B1
(45) Date of Patent: Mar. 15, 2016

(54) ELECTRONIC BRACELET

(75) Inventors: Joelle Clement, Lausanne (CH); Patrick Clement, Belmont (CH); Antoine Moret, Preverenges (CH)

(73) Assignee: Marvell International LTD., Hamilton (BM)

( * ) Notice: Subject to any disclaimer, the term of this patent is extended or adjusted under 35 U.S.C. 154(b) by 320 days.

(21) Appl. No.: 13/421,041

(22) Filed: Mar. 15, 2012

Related U.S. Application Data

(60) Provisional application No. 61/454,220, filed on Mar. 18, 2011, provisional application No. 61/454,232, filed on Mar. 18, 2011.

(51) Int. Cl.
*H04W 84/18* (2009.01)

(52) U.S. Cl.
CPC .................. *H04W 84/18* (2013.01)

(58) Field of Classification Search
CPC .............. H04W 84/18; G06K 19/0723; H04B 1/71637
USPC .................................. 455/41.2, 41.1
See application file for complete search history.

(56) References Cited

U.S. PATENT DOCUMENTS

| | | | |
|---|---|---|---|
| 5,931,764 A * | 8/1999 | Freeman et al. | 482/4 |
| 6,619,835 B2 * | 9/2003 | Kita | 368/281 |
| 7,441,415 B2 * | 10/2008 | Radley-Smith | 63/3 |
| 7,520,438 B2 * | 4/2009 | Kim | G06K 19/0723 235/486 |
| 7,885,898 B2 * | 2/2011 | Narayanaswami | G06Q 10/087 705/28 |
| 8,171,528 B1 * | 5/2012 | Brown | G06F 21/32 726/2 |
| 8,240,575 B2 * | 8/2012 | Kim | G06K 19/0723 235/486 |
| 8,244,181 B2 * | 8/2012 | Shuo | H04M 1/7253 455/41.1 |
| 8,515,505 B1 * | 8/2013 | Pattikonda | H04B 1/385 368/281 |
| 8,604,930 B2 * | 12/2013 | Koraichi | A61B 5/0002 235/380 |
| 8,625,796 B1 * | 1/2014 | Ben Ayed | 380/258 |
| 8,646,056 B2 * | 2/2014 | Poplett | G06F 21/31 726/2 |
| 8,700,092 B2 * | 4/2014 | De Petris | H04L 63/10 455/41.2 |
| 8,718,797 B1 * | 5/2014 | Addepalli | H04W 4/046 700/17 |
| 8,851,372 B2 * | 10/2014 | Zhou | G06F 1/163 235/380 |
| 8,964,298 B2 * | 2/2015 | Haddick | G06F 3/013 359/630 |
| 9,016,565 B2 * | 4/2015 | Zhou | G06Q 20/355 235/380 |
| 9,100,493 B1 * | 8/2015 | Zhou | H04M 1/72522 |
| 2003/0233320 A1 * | 12/2003 | Connor, Jr. | G06Q 20/04 705/39 |
| 2005/0219228 A1 * | 10/2005 | Alameh et al. | 345/173 |
| 2006/0043202 A1 * | 3/2006 | Kim | G06K 19/0723 235/492 |
| 2007/0008127 A1 * | 1/2007 | Jakobsen | G08B 25/016 340/568.1 |
| 2007/0075127 A1 * | 4/2007 | Rosenberg | 235/375 |
| 2007/0203792 A1 * | 8/2007 | Rao | G06Q 20/20 705/14.35 |
| 2007/0298726 A1 * | 12/2007 | Fuqua | H04B 1/48 455/73 |
| 2008/0289030 A1 * | 11/2008 | Poplett | G06F 21/31 726/15 |
| 2009/0200368 A1 * | 8/2009 | Kim | G06K 19/0723 235/375 |
| 2009/0251888 A1 * | 10/2009 | Douglas | 362/103 |
| 2010/0273424 A1 * | 10/2010 | De Petris | H04L 63/10 455/41.2 |
| 2010/0304670 A1 * | 12/2010 | Shuo | H04M 1/7253 455/41.1 |
| 2010/0315225 A1 * | 12/2010 | Teague | 340/539.12 |
| 2011/0018731 A1 * | 1/2011 | Linsky et al. | 340/825.36 |
| 2011/0215921 A1 * | 9/2011 | Ben Ayed et al. | 340/539.11 |
| 2011/0221595 A1 * | 9/2011 | Koraichi | A61B 5/0002 340/573.1 |

(Continued)

*Primary Examiner* — Hai V Nguyen

(57) ABSTRACT

A bracelet including a plurality of circuits. The plurality of circuits includes a wireless communication circuit configured to communicate with a first device, a near-field communication circuit configured to communicate with a second device via a near-field communication antenna, and a power supply circuit including a battery. The first device is remote from the bracelet. The power supply circuit is configured to supply power to one or more of the plurality of circuits.

17 Claims, 50 Drawing Sheets

(56) References Cited

U.S. PATENT DOCUMENTS

| | | | | |
|---|---|---|---|---|
| 2012/0030043 A1* | 2/2012 | Ross | ............... | G06Q 20/20 705/16 |
| 2012/0036018 A1* | 2/2012 | Feliciano | ............... | G06Q 30/02 705/14.66 |
| 2012/0052802 A1* | 3/2012 | Kasslin | ............... | H04W 48/12 455/41.2 |
| 2013/0127980 A1* | 5/2013 | Haddick | ............... | G06F 3/013 348/14.08 |
| 2013/0146659 A1* | 6/2013 | Zhou | ............... | G06Q 20/355 235/380 |
| 2013/0212022 A1* | 8/2013 | Lanc | ............... | G06Q 20/32 705/44 |
| 2014/0018059 A1* | 1/2014 | Noonan | ............... | H04W 8/005 455/419 |
| 2014/0108151 A1* | 4/2014 | Bookstaff | ............... | G06Q 10/00 705/14.64 |
| 2014/0108256 A1* | 4/2014 | Bircher-Nagy | ............... | G06F 21/71 705/44 |
| 2014/0239065 A1* | 8/2014 | Zhou | ............... | G06F 1/163 235/380 |
| 2014/0303807 A1* | 10/2014 | Addepalli | ............... | H04W 4/046 701/1 |
| 2015/0052253 A1* | 2/2015 | Johnson | ............... | H04L 61/1511 709/226 |
| 2015/0294303 A1* | 10/2015 | Hanson | ............... | G06Q 20/347 235/379 |

* cited by examiner

FIG. 5

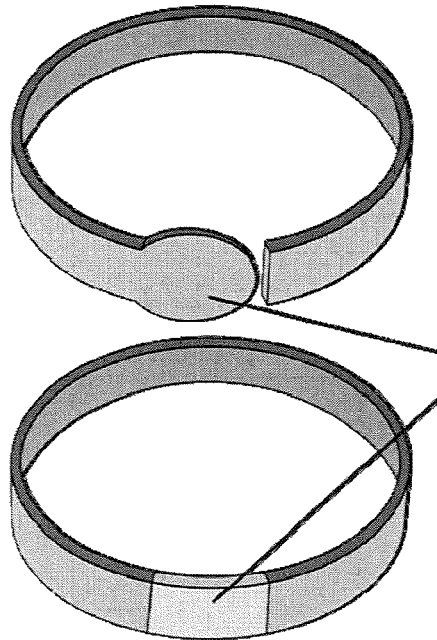
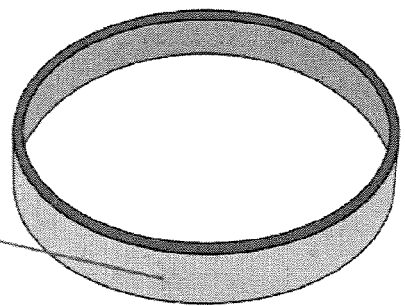
FIG. 8

Snapping fingers or hand/wrist motion could be some gestures to select, choose, confirm information.

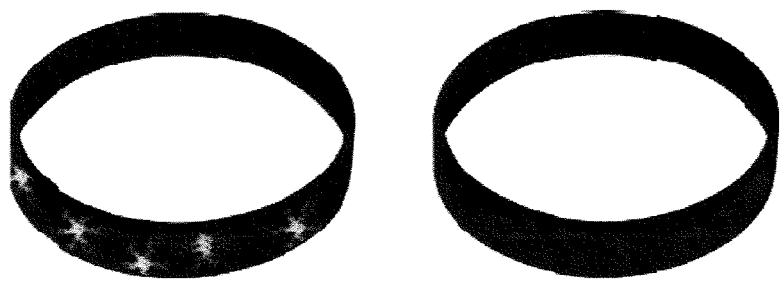
FIG. 21

FIG. 28

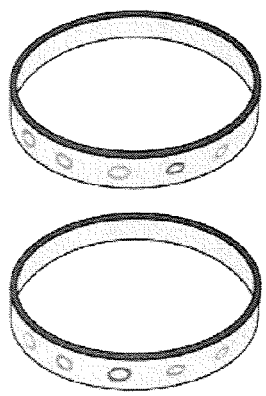
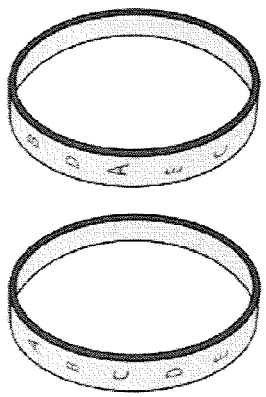
At any use, the keys change their position.
Possibility to choose between characters and colors.
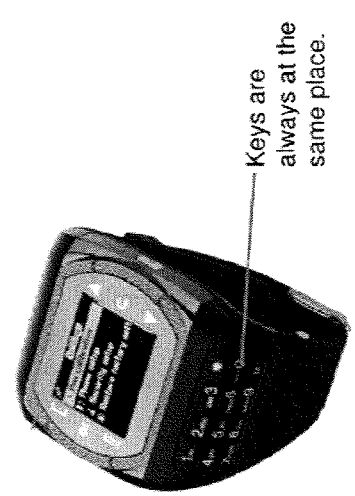
Keys are always at the same place.
Second display sequence example
First display sequence example
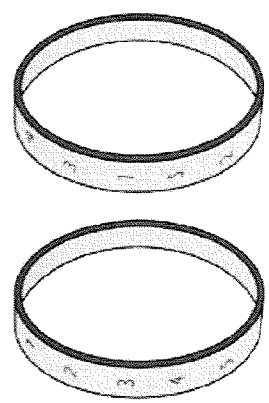
FIG. 29

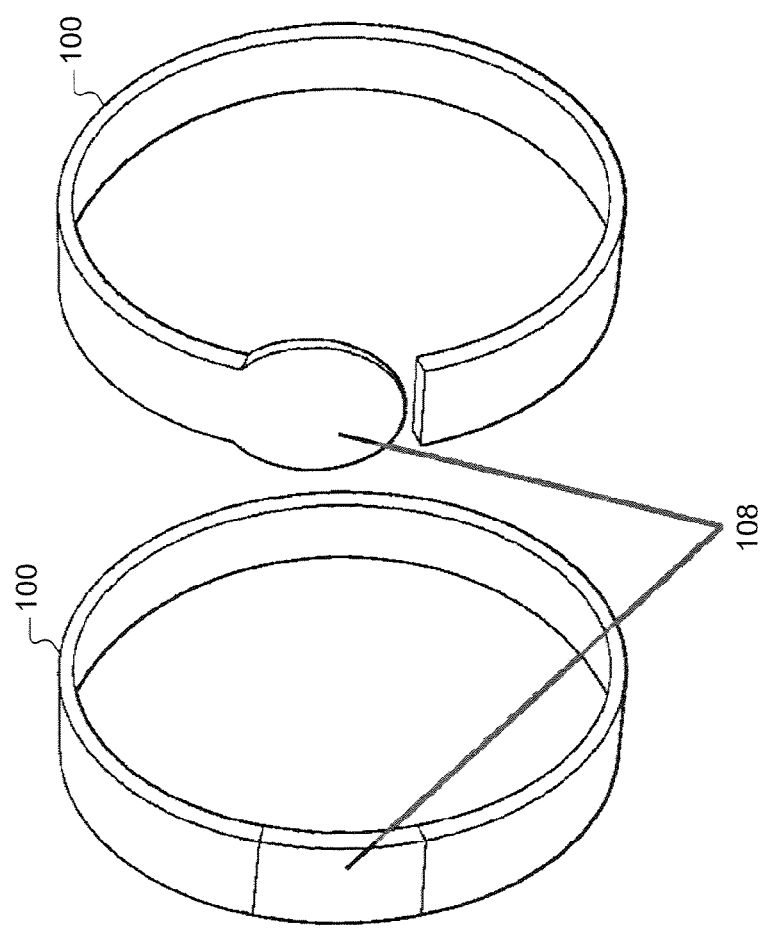

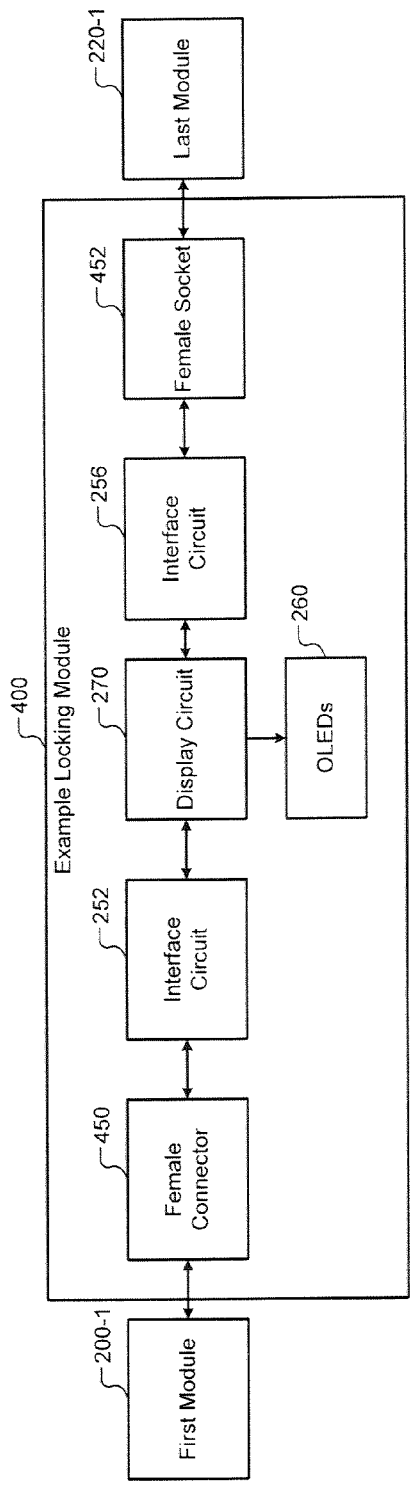
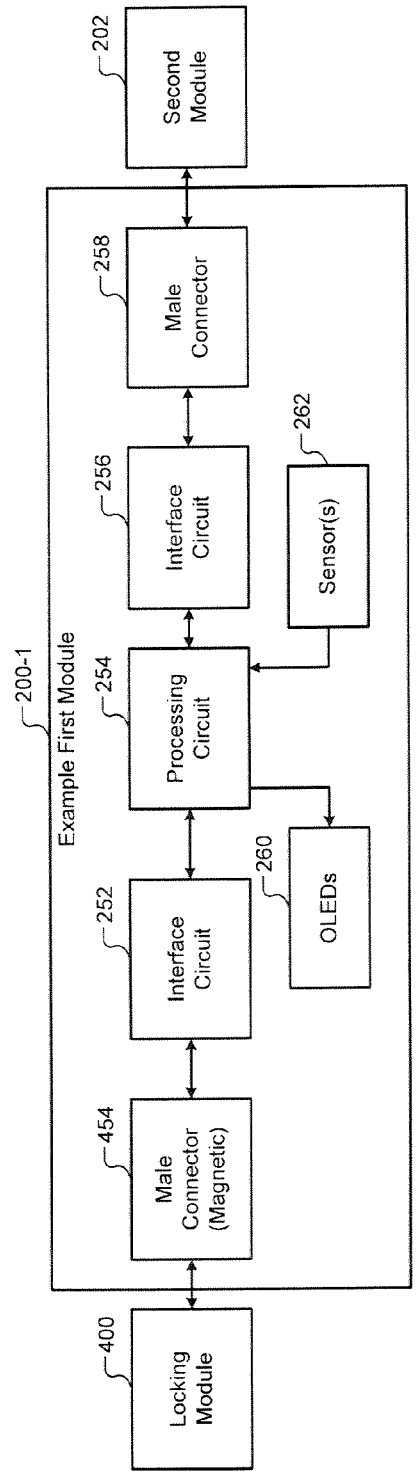
FIG. 40B
FIG. 40C

ELECTRONIC BRACELET

CROSS-REFERENCE TO RELATED APPLICATIONS

This present disclosure claims the benefit of U.S. Provisional Application No. 61/454,220, filed on Mar. 18, 2011, and of U.S. Provisional Application No. 61/454,232, also filed on Mar. 18, 2011. The disclosures of the applications referenced above are incorporated herein by reference in their entirety.

FIELD

The present disclosure relates generally to wireless devices, and more particularly to an electronic bracelet that can be used as a wireless companion device of another device—e.g., a smartphone, a tablet, a personal computer (PC), a laptop, a gaming station, or other electronic device having a processor.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Smartphones can be used for many purposes including making phone calls, sending emails and text messages, browsing the Internet, and downloading and executing multimedia applications. Accordingly, smartphones are typically equipped with multiple communication modules such as a cellular communication module, a WiFi communication module, a Bluetooth® module, and a global position system (GPS) module. Additionally, smartphones are typically equipped with one or more processors. When equipped with multiple processors, one processor (e.g., a communication processor) can be used to process communications-related data while another processor (e.g., an application processor) can be used to process applications-related data. Smartphones also include storage devices such as solid-state disk drives. Further, smartphones include rechargeable batteries and power management modules that efficiently utilize power supplied by the batteries.

SUMMARY

A bracelet including a plurality of circuits. The plurality of circuits includes a wireless communication circuit configured to communicate with a first device, a near-field communication circuit configured to communicate with a second device via a near-field communication antenna, and a power supply circuit including a battery. The first device is remote from the bracelet. The power supply circuit is configured to supply power to one or more of the plurality of circuits.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 5 depicts conventional wristwatches that include centrally located electronics.

FIG. 8 depicts a fourth embodiment of a bracelet that includes a near-field communication (NFC) antenna.

FIG. 21 depicts a thirteenth embodiment of a bracelet that changes a graphics pattern being displayed according to the changes in environment of the bracelet.

FIG. 28 depicts conventional wristwatches having keyboards.

FIGS. 29 and 30 depict a sixteenth embodiment of a bracelet that includes displays and touch sensors located throughout the bracelet.

FIG. 35B depicts a bracelet having a near-field communication antenna.

DESCRIPTION

The present disclosure relates to a an electronic bracelet that can be used as a companion device of another electronic device such as a smartphone, a PC, a laptop, a tablet, a gaming station, or any other electronic device having a processor. In an embodiment, the amount of electronics and circuits embedded in the bracelet can be kept to a minimum because most of the computing power resides in the other electronic device. In an embodiment, the electronics and circuits embedded in the bracelet are distributed all around the bracelet, which allows for providing smart, trendy, and appealing design and shape to the bracelet.

Figure 1:
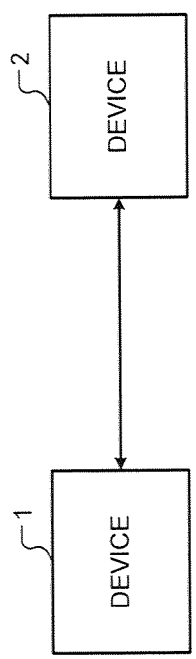
FIG. 1 depicts a first device in communication with a second device, in which the second device serves a companion device to the first device.

FIG. 1 illustrates a first device 1 in wireless communication with a second device 2. In an embodiment, the first device 1 is a companion device to the second device 2. In such an embodiment, the first device 1 is operable to i) perform one or more functions on the second device 2, and/or ii) perform one or more functions on behalf of the second device 2, as described in greater detail below. Additionally, in such an embodiment, a user operating the second device 2 can perform one or more functions on the first device 1 to alter operation or functions of the first device 1, as described in greater detail below. The first device 1 can be an electronic bracelet or any other device, e.g., a stylus, a ring, a leash, a sticker, a lapel pin, or other item. The second device 2 can be a smartphone, a PC, a laptop, a tablet, a gaming station, or any other electronic device having a processor. In an embodiment, the first device 1 leverages the computing power of the second device 2. In such an embodiment, the amount of electronics and circuits embedded in the first device 1 can be kept to a minimum since most of the computing power resides in the second device 2. The first device 1 can wirelessly communicate with the second device 2.

Figure 2:
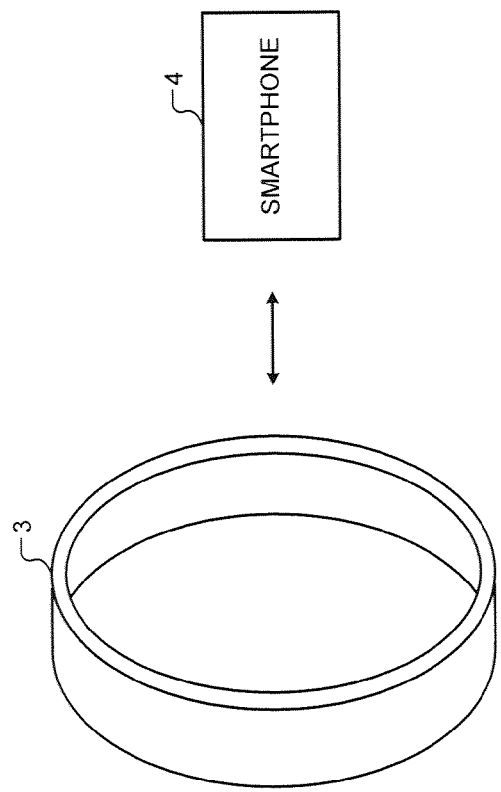
FIG. 2 depicts one embodiment of the first device and the second device of FIG. 1.

FIG. 2 illustrates examples of the first device 1 and the second device 2 according to one embodiment. For example, the first device 1 can be a bracelet 3, and the second device 2 can be a smartphone 4. The bracelet 3 can communicate with the smartphone 4 via Bluetooth® (BT), for example. The bracelet 3 can utilize the processing power of the smartphone 4. Accordingly, the amount of electronics and circuits embedded in the bracelet 3 can be kept to a minimum, and the bracelet 3 can be designed to have smart, trendy, and appealing design and shape. In an embodiment, the bracelet 3 can be used (as a companion device to the smartphone 4) to perform one or more functions on behalf of the smartphone 4. For example, the bracelet 3 can be used to assist the smartphone 4 in completing a transaction—e.g., a near-field communication (NEC) payment transaction or other NFC transaction. Additionally, a user wearing the bracelet 3 may use the bracelet 3 to i) move a cursor or a selection arrow located on a display of the smartphone 4, or ii) make a selection on the display of the smartphone 4 based on movements or gestures or touching of the bracelet 3. These functions along with other example functions are further described in greater detail below in connection with various embodiments of the bracelet 3.

First Embodiment

Companion Device of a Smartphone to be Worn on a Wrist of a User

Figure 3:
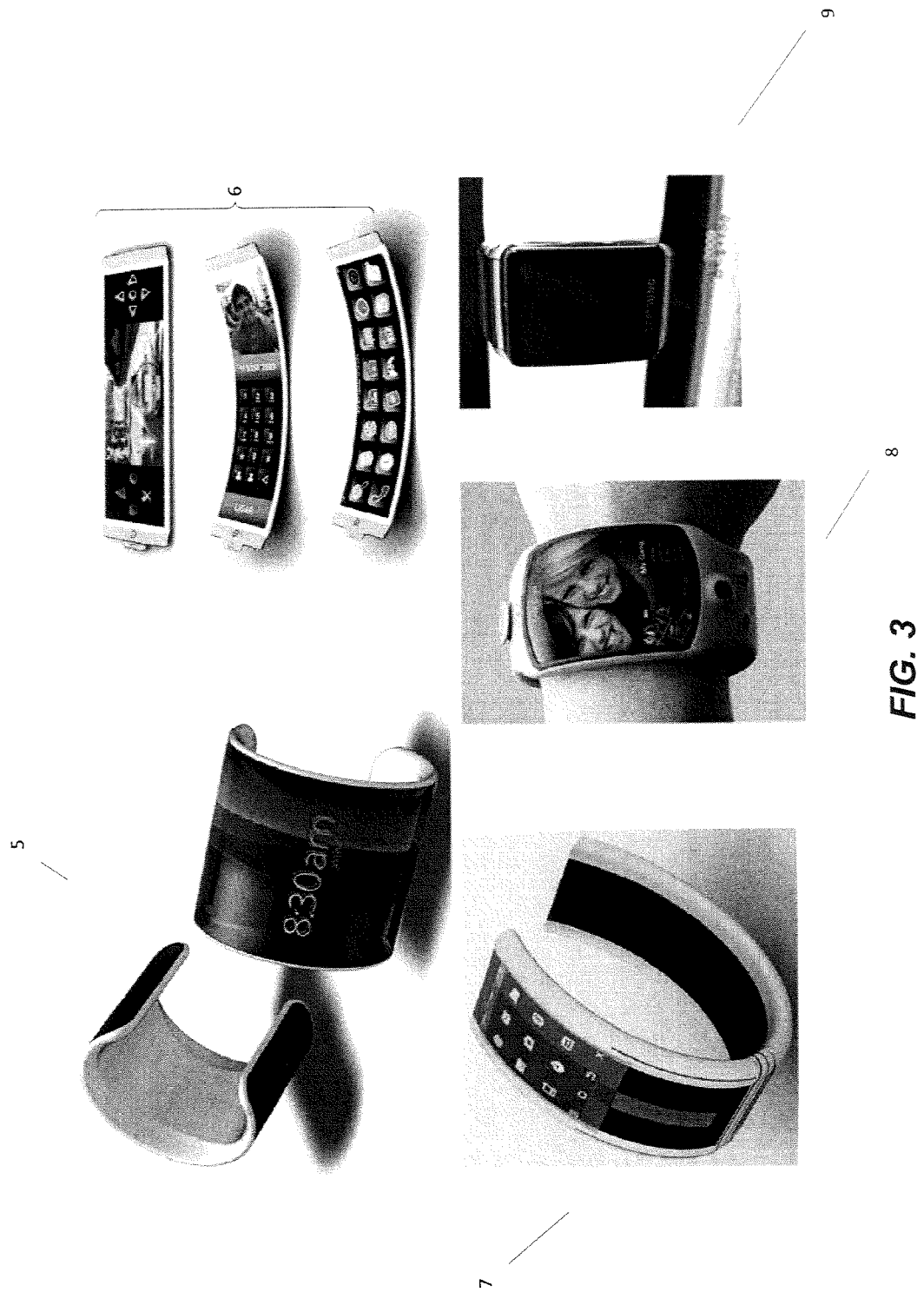
FIG. 3 depicts conventional wristwatches and bracelets.
Figure 4:
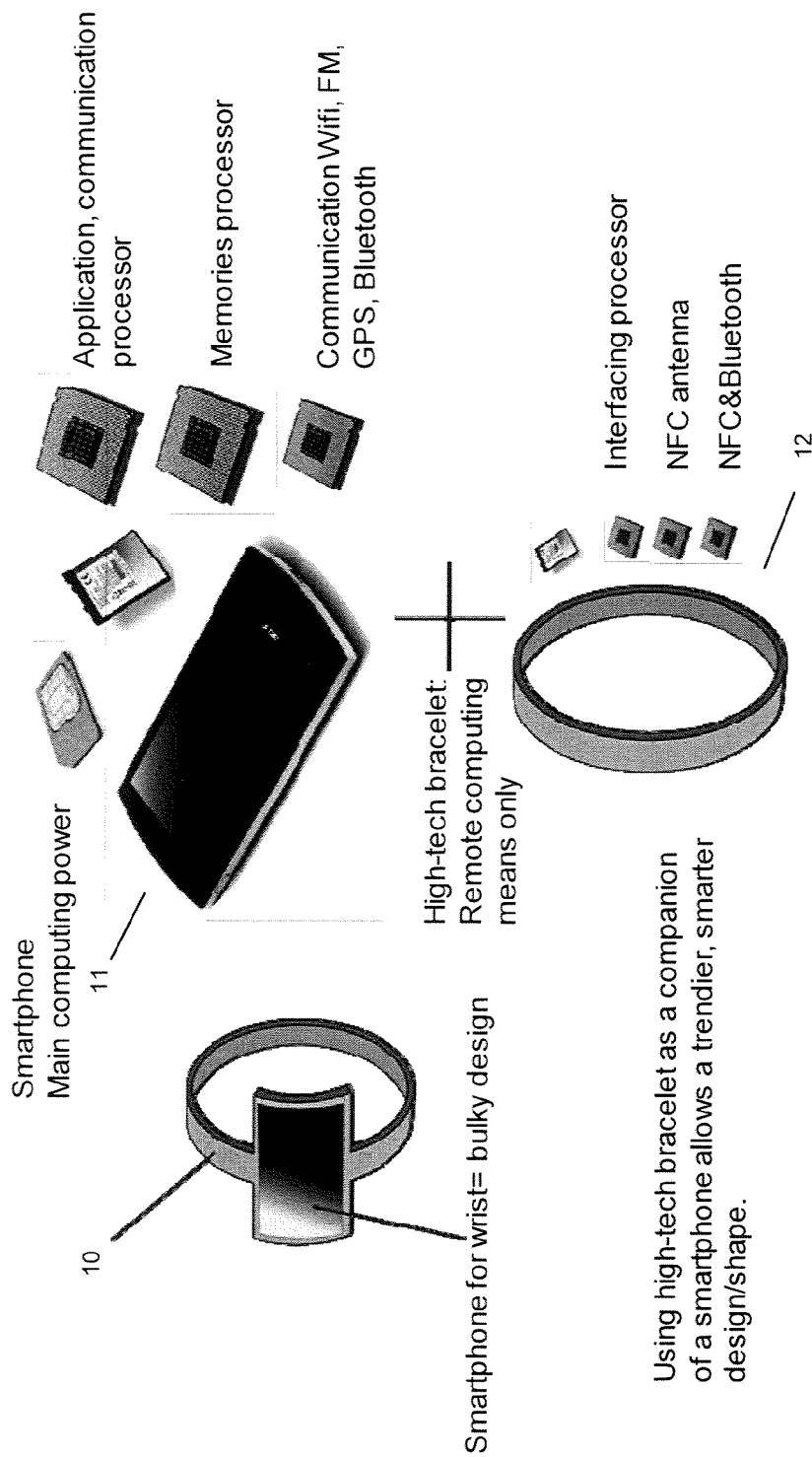
FIG. 4 depicts a first embodiment of an electronic bracelet (bracelet) that can communicate with a smartphone.

FIGS. 3 and 4 illustrate examples of devices that are typically worn on the wrist along with an example of a companion device (e.g., a bracelet 12) of a smartphone to be worn on the wrist of a user according to one embodiment. In FIG. 3, examples of devices that are typically worn on a wrist are shown. As shown in FIGS. 3 and 4, these devices 5-10 have various shapes and sizes and are bulky. Additionally, each of these devices 5-10 operates as standalone devices. That is, each of these devices 5-10 must include processors that provide the computing power for performing the functions of these devices. Accordingly, these devices 5-10 are bulky and cannot be designed to have smart, trendy, and appealing design and shape.

The present disclosure proposes to redefine a wristwatch/high-tech bracelet as an extension or as a companion device of a smartphone, for example. The redefined companion device according to the present disclosure includes in the wristwatch/high-tech bracelet only the electronics and circuits which make possible using the device as a companion device.

In FIG. 4 illustrates a smartphone 11 and a bracelet 12 according to one embodiment of the present disclosure. The smartphone 11 provides the main computing power for the bracelet 12. The smartphone 11 includes an application processor, a communication processor, a memory processor, and communication circuits such as WiFi, FM, GPS, and Bluetooth. Additionally, the smartphone includes a SIM card and a large-capacity battery.

In one embodiment, the bracelet 12 includes only an interfacing processor, a near-field communication (NFC) circuit, and a Bluetooth communication circuit, for example. The Bluetooth communication circuit of the bracelet 12 communicates with the smartphone 11 and/or a PC. The Bluetooth communication circuit of the bracelet 12 can communicate with the PC directly or via the smartphone 11. In an embodiment, the bracelet 12 includes a smaller battery relative to the smartphone 11 due to the bracelet 12 having fewer circuits than the smartphone 11. The bracelet 12 leverages the computing power of the smartphone 11.

Using smaller and fewer components in the bracelet 12 allows for a trendier and smarter design and shape for the bracelet 12. Additionally, leveraging the processing power and storage capacity of the smartphone 11 avoids duplicating resources such as processors and storage devices on the bracelet 12.

Second Embodiment

Wristwatch/High-Tech Bracelet with Distributed Electronics

Figure 6:
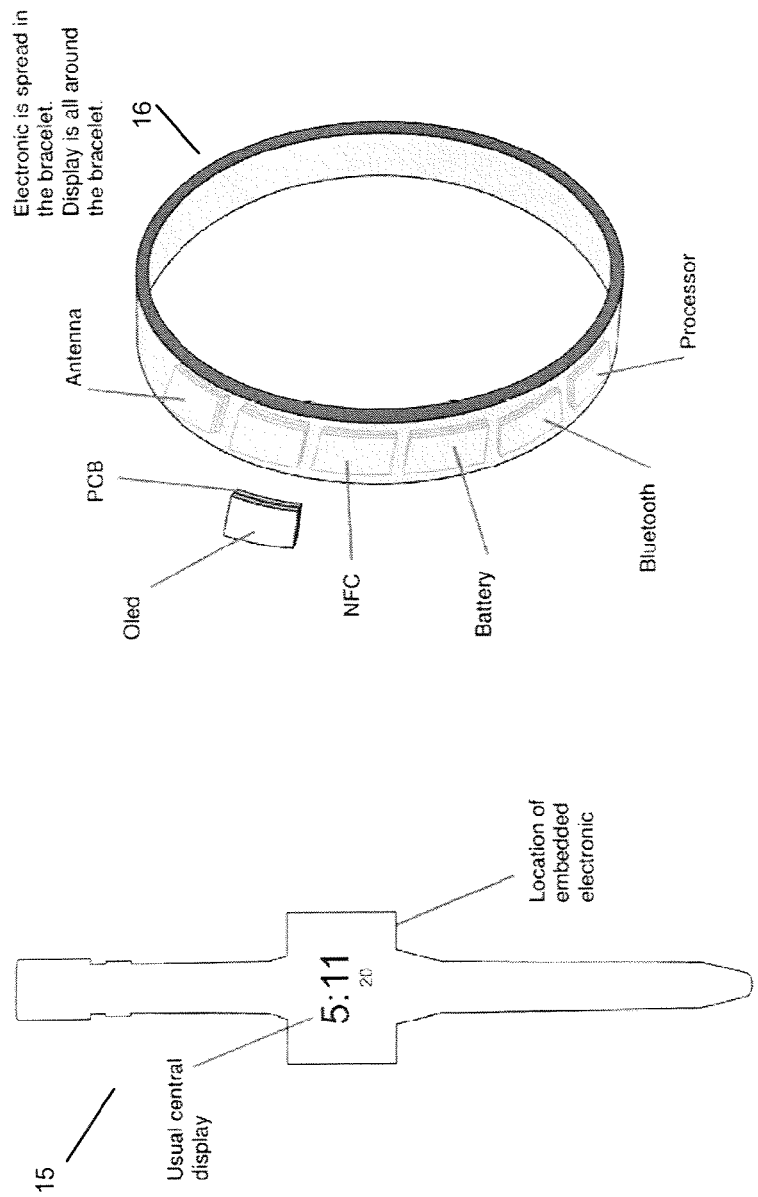
FIG. 6 depicts a second embodiment of a bracelet that includes electronics displaced throughout the bracelet.

Referring now to FIGS. 5 and 6, details of the proposed design for the companion device according to one embodiment of the present disclosure are shown. In FIG. 5, examples of other high-tech wristwatches 13 and 14 are shown. The other high-tech wristwatches 13 and 14 have all of the electronics contained in a single central part. The other high-tech wristwatches 13 and 14 therefore appear bulky and ugly.

Instead, the present disclosure proposes embedding high-tech content or functions into the wristwatch while making the wristwatch appear not bulky and ugly, but trendy and fashionable. Specifically, the present disclosure proposes embedding electronics not in the central part but in the whole bracelet. The present disclosure redefines the aesthetic of the wristwatch/bracelet by spreading or distributing the electronics throughout the bracelet. Parts of the bracelet such as electronics and battery are distributed all along the circumference of the bracelet. The parts of the bracelet are not located at one central place like a dial of a wristwatch. Additionally, the present disclosure proposes spreading or distributing LED/OLED displays (rigid or flexible) all around the bracelet.

In FIG. 6, a wristwatch 15 with a usual central display and having a central location for embedded electronics is shown. Also, a bracelet 16 according to one embodiment of the present disclosure is shown. Unlike in the wristwatch 15, the electronics in the bracelet 16 is spread or distributed throughout the bracelet 16 and is not concentrated just in a central part of the bracelet 16. Additionally, unlike in the wristwatch 15, the display in the bracelet 16 is spread all around the bracelet 16 and is not concentrated just in a central part of the bracelet 16. For example, the bracelet 16 includes functional blocks such as an antenna, an NFC circuit, a battery, a Bluetooth communication circuit, a processor, and so on, which are spread throughout the bracelet 16 as shown. Each or some of the functional blocks may include a PCB, an OLED display, and/or a sensor on top of the functional block.

The proposed designs described in the present disclosure allows for different and more aesthetic, fashionable, and trendy design for a bracelet. Additionally, the proposed designs described in the present disclosure provide a new way of displaying time on a bracelet. For example, hours, minutes, and seconds may be displayed on one or more displays located all around the bracelet 16, not just on a display centrally located as in the wristwatch 15. Further, the proposed designs described in the present disclosure provide a new way of using the wristwatch. For example, the displays all around the bracelet 16 can display different graphic patterns according to the environment sensed by sensors located on one or more functional blocks of the bracelet 16.

Third Embodiment

Figure 7:
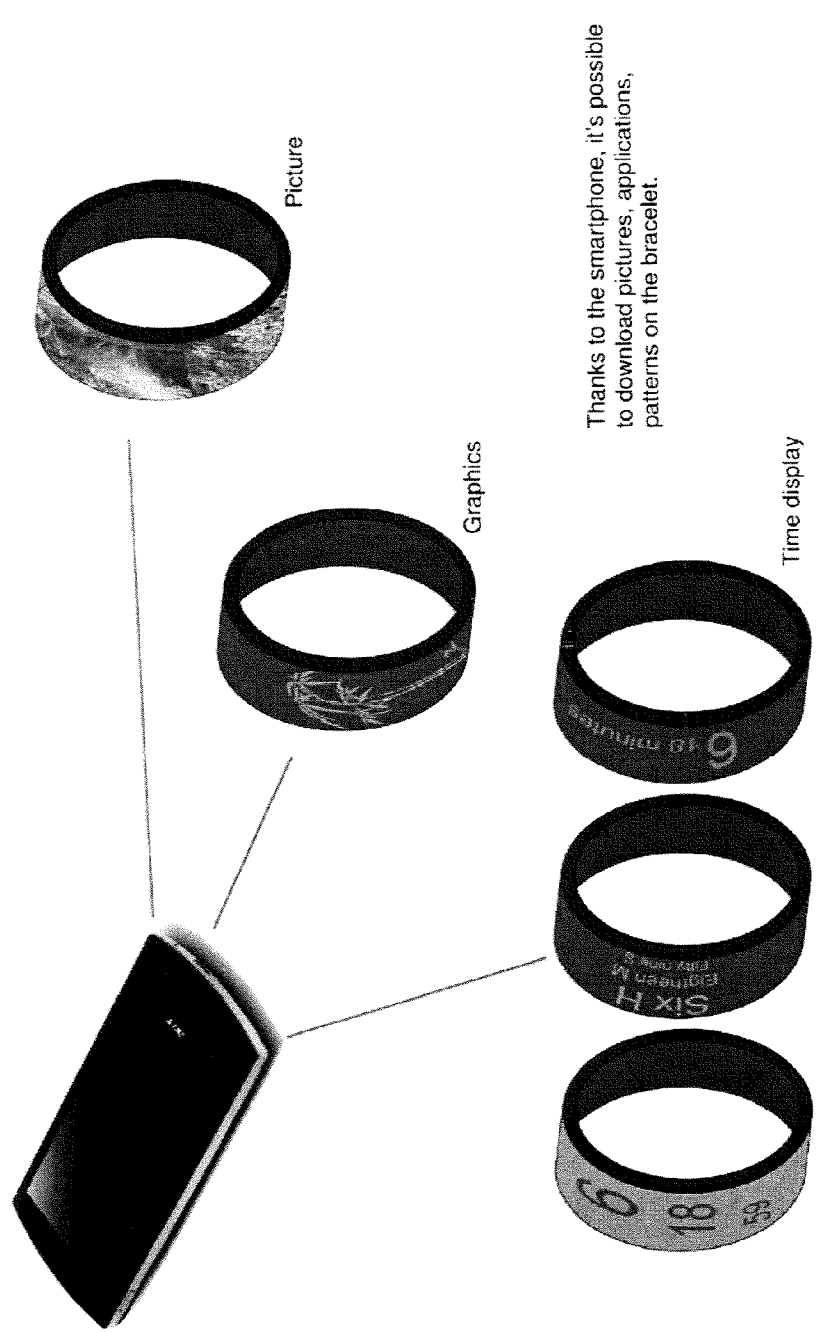
FIG. 7 depicts a third embodiment of a bracelet configured to display different graphics patterns downloaded via a smartphone.

Downloading Dedicated Applications to a High-Tech Bracelet from a Smartphone/Computer Referring now to FIG. 7, the present disclosure proposes that dedicated applications can be downloaded from a smartphone or a computer to the high-tech companion bracelet/wristwatch. Generally, downloadable applications, pictures, patterns, etc. are designed for use with computers and smartphones, not for a wristwatch or a high-tech bracelet. In contrast, the dedicated applications proposed by the present disclosure allow downloading applications on the bracelet for customizing the bracelet. For example, the dedicated applications can be downloaded to the bracelet to display time in different personalized styles as shown. Further, the downloaded applications can be used to display personalized graphics and pictures on the bracelet as shown.

The downloaded applications take advantage of the technology such as displays, sensors, antennas, communication circuits, accelerometers embedded in the bracelet to create new functionalities, new graphics, and so on, as explained below in detail. Therefore, the bracelet can operate as an open platform since the functionality of the bracelet can be customized by downloading different applications. The bracelet of the present disclosure is therefore different than conventional devices such as wristwatches which have a predefined functionality such as displaying time in a fixed manner. Further, the proposed design of the bracelet according to the present disclosure enables a business for developing and selling downloadable applications for high-tech bracelets.

Applications can be downloaded to the high-tech bracelet through the Bluetooth or WiFi link from a smartphone, a computer, or any other host. Some applications can be parameterized (i.e., customized, adjusted, or personalized) from the smartphone. Some applications can be spread between the smartphone and the bracelet. The applications can evolve depending on sensors and/or options embedded in the bracelet. The bracelet can be used in conjunction with an application to control a remote device.

Fourth Embodiment

Localizing NFC Antenna in a High-Tech Bracelet

Referring now to FIG. 8, the proposed design of the bracelet according to one embodiment of the present disclosure provides a localized NFC antenna for easily performing various operations and transaction using the bracelet. To effectively use the NFC function, the NFC antenna needs to be presented close to a NFC reader (or other NFC device). The NFC antenna on the smartphone, however, may not be easy to use. For example, the NFC antenna on the smartphone may have to be pointed and directed to the NFC reader.

Instead, in one embodiment, the present disclosure provides a design and shape for the bracelet that helps localize the NFC antenna within the high-tech bracelet. To perform a transaction using the NFC antenna embedded in the bracelet, the bracelet simply needs to be presented to the NFC reader. Due to the design and shape of the bracelet, the location of the NFC antenna in the bracelet is easy to recognize. The location of the NFC antenna in the bracelet can be such that the NFC antenna can be forced to stay at a predetermined location on the wrist so that the location of the NFC antenna can be easily identified. The fact that the NFC antenna distinguishes itself inside the bracelet allows for a better utilization of the NFC antenna.

For example, as shown in FIG. 8, if the shape of the bracelet is simply circular, the bracelet can move freely around the wrist, and the location of the NFC antenna in the bracelet can be difficult to ascertain. Instead, the NFC antenna may be given a distinctive shape (e.g., an oval shape as shown), and the NFC antenna may be located at an extremity of the bracelet for easy location and use. Alternatively, if the bracelet is circular in shape, a plurality of NFC antennas may be located at locations around the bracelet so that transactions can be easily performed without the need to locate and direct (i.e., point) the NFC antenna to the reader. In one embodiment, subsequent to the NFC antenna of the bracelet being located proximate to the NFC reader, NFC communication circuitry of the bracelet can receive data corresponding to the transaction from the NFC reader. Wireless communication circuitry (e.g., Bluetooth circuitry or WiFi circuitry) of the bracelet can then wirelessly transmit the data corresponding to the transaction to another device (e.g., a smartphone) in communication with the bracelet.

Fifth Embodiment

Figure 9:
FIG. 9 depicts a fifth embodiment of a bracelet that includes a light sensor.

High-Tech Bracelet with Ambient Light Detection as a Criterion to Turn It On/Off Referring now to FIG. 9, in one embodiment, a bracelet, or different functions of a bracelet, can be turned on or off depending on different criteria to save power. For example, a light sensor may be embedded in the bracelet to sense the intensity of ambient light. Sensing the intensity of ambient light allows the bracelet to determine when at least the display portion of the bracelet may be turned off. For example, when the bracelet is covered by a sleeve, the bracelet may be placed in a standby mode to save power, where the display portion of the bracelet may be turned off. Conversely, when the bracelet is not covered by a sleeve, the display portion of the bracelet may be turned on. Further, the display portion of the bracelet may be turned off at night regardless of whether a sleeve covers the bracelet, while the display portion of the bracelet may be fashionably turned on at parties at night.

The function of turning the display portion of the bracelet on and off can be activated or deactivated from the smartphone through a Bluetooth link, for example. An application on the smartphone may be parameterized to determine which functions of the bracelet get turned off. For example, to save power, while the display portions of the bracelet may be turned off, the NFC function may be turned on so that transactions that require use of the NFC function may be seamlessly performed even if the sleeve covers the bracelet.

Sixth Embodiment

Activation or Validation Through Hand Gestures

Figure 10:
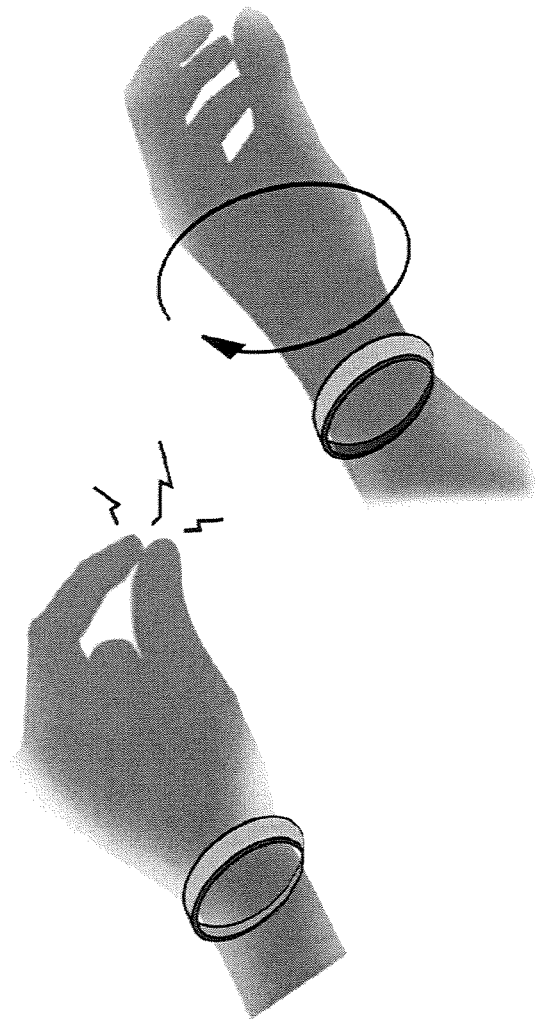
FIG. 10 depicts a sixth embodiment of a bracelet that includes sensors used to sense gestures made by a user wearing the bracelet.

Referring now to FIG. 10, a bracelet according to one embodiment of the present disclosure allows using fingers, wrist, or hand gestures to validate or activate functions in the high-tech bracelet or in any other device associated with the bracelet. For example, a microphone embedded in the bracelet may detect specific sounds (e.g., a snap of fingers, a clap sound, or a voice command). Additionally or alternatively, accelerometers orthogonally embedded in the bracelet may detect gestures made using fingers, wrist, and/or hand. The electronics in the bracelet detects, decodes, and converts specific sounds or accelerometer signals into activation or validation commands. Additionally, or alternatively, capacitive sensors on the bracelet can be touched using a finger to validate or activate functions in the high-tech bracelet or in any other device associated with the bracelet. In contrast to a stylus or a wireless mouse, the bracelet does not need to be continually grasped by a user in order to control a direction or movement of the bracelet. Accordingly, the fingers of a user are free to perform other tasks while the user is using the bracelet to perform functions on or on behalf of another device associated with the bracelet.

For example, a sound of a snap of fingers can cause the bracelet to turn off the display portion of the bracelet, skip a track of music in a music player associated with the bracelet, or turn off lights in a room. As another example, a circular motion of the palm around the wrist once or twice in one direction can cause the bracelet to move a power-point presentation on a PC forward by one or two slides and motion in another direction can cause the bracelet to move the power-point presentation on the PC back by one or two slides.

Still other examples include pressing the capacitive sensor on the bracelet using a finger to activate/deactivate a function of the bracelet or of a device associated with the bracelet. Essentially, the bracelet can be used as a remote control to remotely control other devices associated with the bracelet. Many other usages are contemplated. Advantages include ease of use and obviating a need to hold anything in hand to perform such functions.

Seventh Embodiment

Combined Connector and Locking Element for High-Tech Bracelet

Figure 11:
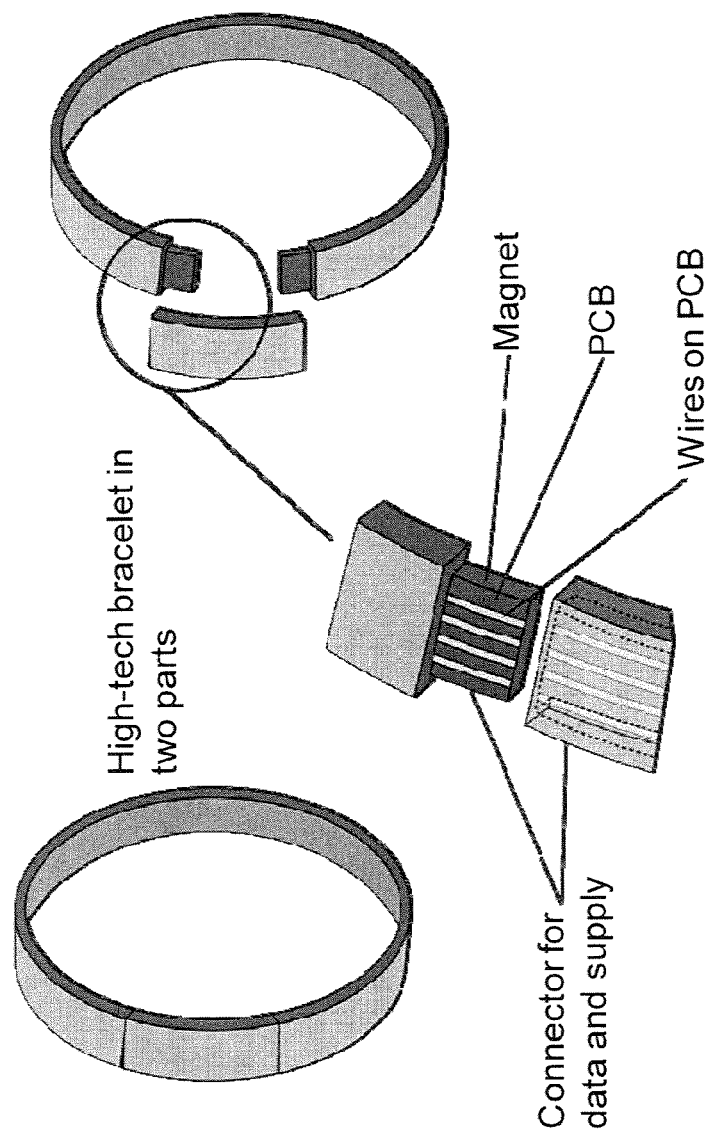
FIG. 11 depicts a seventh embodiment of a bracelet that includes a locking element.

Referring now to FIG. 11, a bracelet according to one embodiment of the present disclosure can be split in two parts to allow easy closing of the bracelet around the wrist. Specifically, the high-tech bracelet can be split (in one embodiment) in two parts so that the bracelet can be worn easily on the wrist. The two parts are interconnected by a locking element. The locking element includes two female connectors that mate with two male connectors of the bracelet. At least one of the two connectors of the bracelet includes a flex cable mounted on a magnet as shown. The flex cable includes conductors that carry data and power from one connector of the bracelet to another connector of the bracelet via the locking element.

In some implementations, one of the two connectors of the bracelet may have no cable connections and therefore may have a stronger magnet than the other connector of the bracelet to tightly lock with the locking element. While the bracelet is shown to have male connectors and the locking element is shown to have female connectors, any combination of male and female connectors may be used for the bracelet and the locking element. Further, while the connectors of the bracelet are shown to include a magnet, the connectors of the locking element may include a magnet instead of or in addition to the connectors of the bracelet.

Eighth Embodiment

Figure 12:
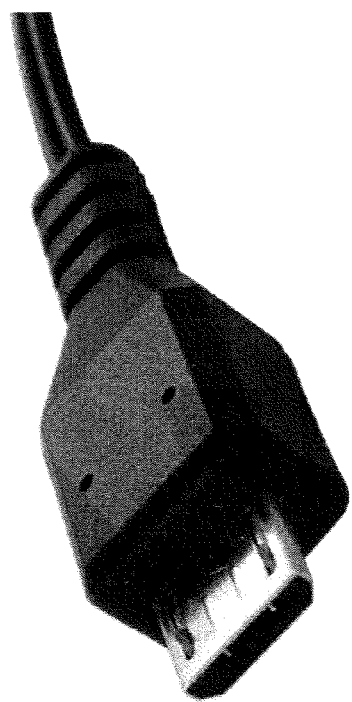
FIG. 12 depicts a connector used to supply power and to charge a battery of a device.
Figure 13:
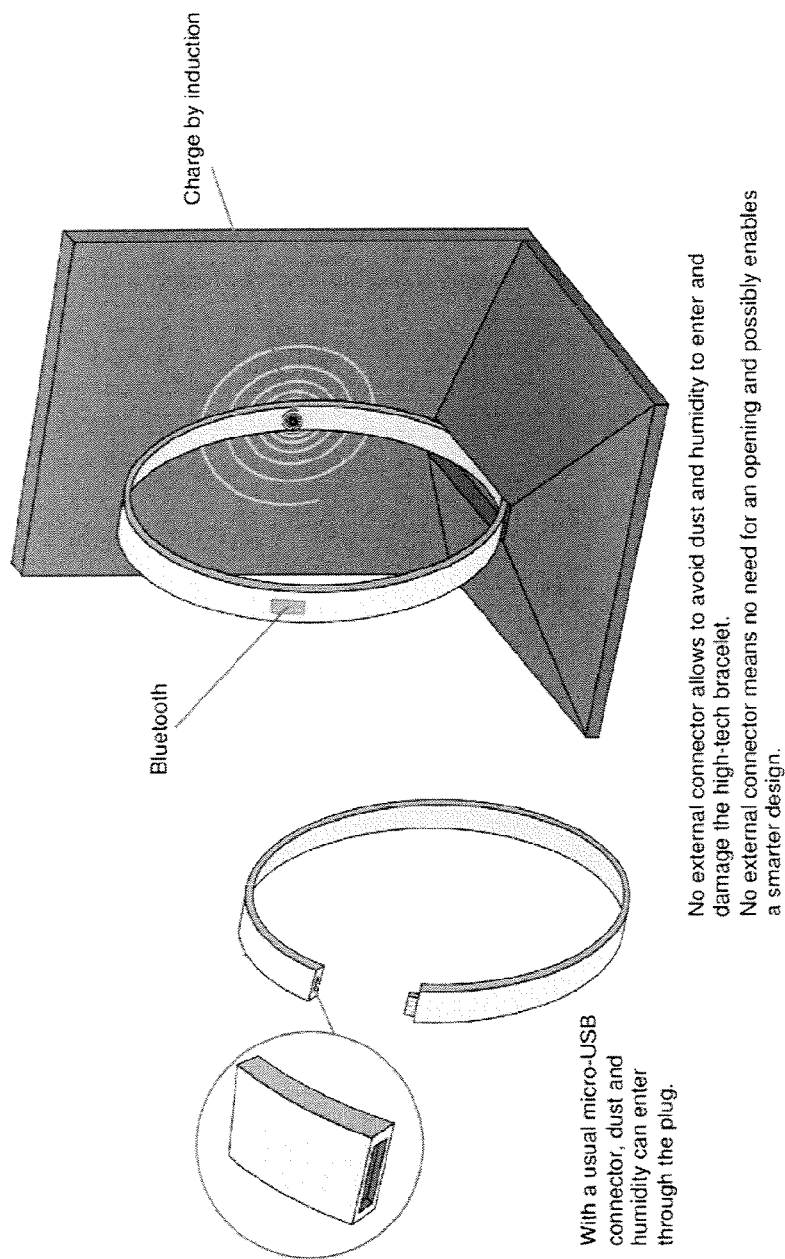
FIG. 13 depicts an eighth embodiment of a bracelet that uses an NFC antenna to wirelessly receive power by induction to charge a battery of the bracelet.

Way of Supplying Power and Communicating with a High-Tech Bracelet Without a Connector FIGS. 12 and 13 illustrate a technique of supplying power to a bracelet according to one embodiment of the present disclosure. In FIG. 12, an example of a connector typically used to supply power to most hand-held devices is shown. Such connectors have various drawbacks that prevent designers from designing improved, smartly shaped/designed bracelets and wristwatches. For example, the connectors can be bulky and may not be waterproof. Additionally, such connectors are prone to collecting dust and other materials that can damage the connectors and/or reduce the quality of connections provided by the connectors.

In FIG. 13, a bracelet according to one embodiment of the present disclosure does not require any cables and connectors to charge the batteries in the bracelet. Instead, the bracelet uses the NFC antenna embedded in the bracelet to charge the batteries in the bracelet. Specifically, the NFC antenna embedded in the bracelet communicates with an induction charger, receives power from the induction charger wirelessly, and charges the batteries in the bracelet using the power received wirelessly from the induction charger. Using the NFC antenna as an interface to capture energy by induction eliminates the need for additional hardware such as a cable and connector to charge the batteries in the bracelet.

Additionally, the bracelet uses Bluetooth or WiFi link to communicate with other devices such as a smartphone, a PC, a laptop computer, and so on. Accordingly, no wired connections, cables, and connectors are used in such communications as well. Therefore, the bracelet functions entirely without any cables and connectors, which allows designers to design the bracelet in a trendy, fashionable manner. Further, since the bracelet does not use a connector for charging the bracelet, the bracelet is not prone to damage due to dust and/or humidity.

Optionally, however, in place of the locking element described before, a powering element can be plugged into one of the two connectors of the bracelet. A cable having a micro-USB connector can extend from the powering element and can connect the bracelet to a conventional powering device for charging the batteries of the bracelet.

Ninth Embodiment

High-Tech Bracelet with Detection and Use of Spatial Orientation

Figure 14:
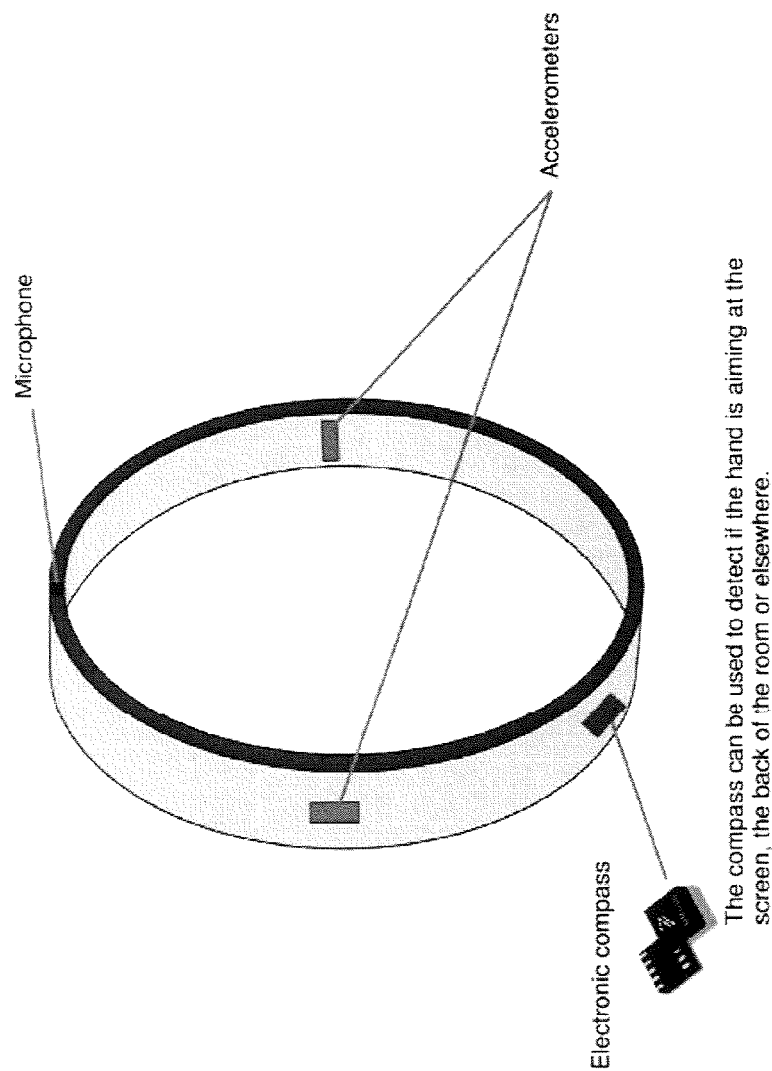
FIG. 14 depicts a ninth embodiment of a bracelet that includes accelerometers and an electronic compass.
Figure 15:
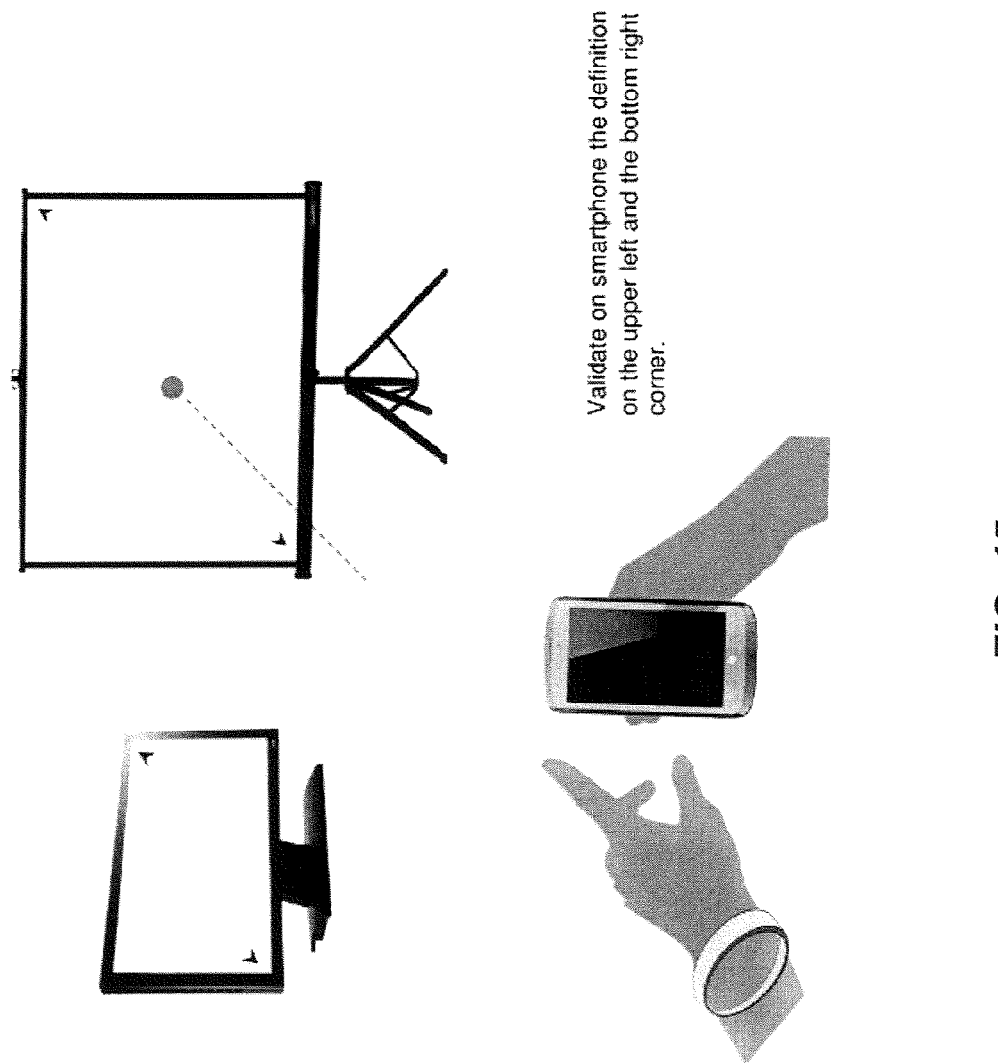
FIG. 15 depicts a bracelet used in conjunction with a smartphone to define positions of a projection screen when using the bracelet as a pointing device.

Referring now to FIGS. 14 and 15, a bracelet according to one embodiment of the present disclosure can be used to detect spatial orientation or motion of the arm in order to perform one or more actions. In FIG. 14, the bracelet according to the present disclosure can include embedded orthogonal accelerometers and can optionally include an embedded electronic compass. The accelerometers can detect the spatial orientation of the arm wearing the bracelet, and the electronic compass can sense the direction of motion of the arm wearing the bracelet. For example, a pair of orthogonal accelerometers can provide a 3D indication of where the arm is pointing. Additionally, the electronic compass can provide the direction in which the arm is pointing.

In FIG. 15, the information provided by the accelerometers and the electronic compass can be used to define the orientation and/or the motion of the arm of a user wearing the bracelet. Accordingly, the bracelet can be used as a pointing device, a laser pointer, and/or a remote control. To activate a cursor or a pointer or to initiate an action from the remote control, a user can perform specific predefined motions using the wrist or fingers of the arm wearing the bracelet. Alternatively, a microphone embedded in the bracelet can capture the sound of clicking finger to perform an action.

For example, when making a presentation on a projection screen using power-point slides displayed on a PC, the user can initially validate using a smartphone a definition of an upper left corner and a bottom right corner of the projection screen as part of a calibration procedure. Subsequently, the user can twist the wrist wearing the bracelet to move the presentation forward to the next slide or backward to the previous slide. The user can move the pointer on the projection screen by moving the hand on the slide. The electronic compass can detect whether the hand is aiming at the projection screen or elsewhere.

Tenth Embodiment

All-Around Display in a High-Tech Bracelet/Wristwatch

Figure 16:
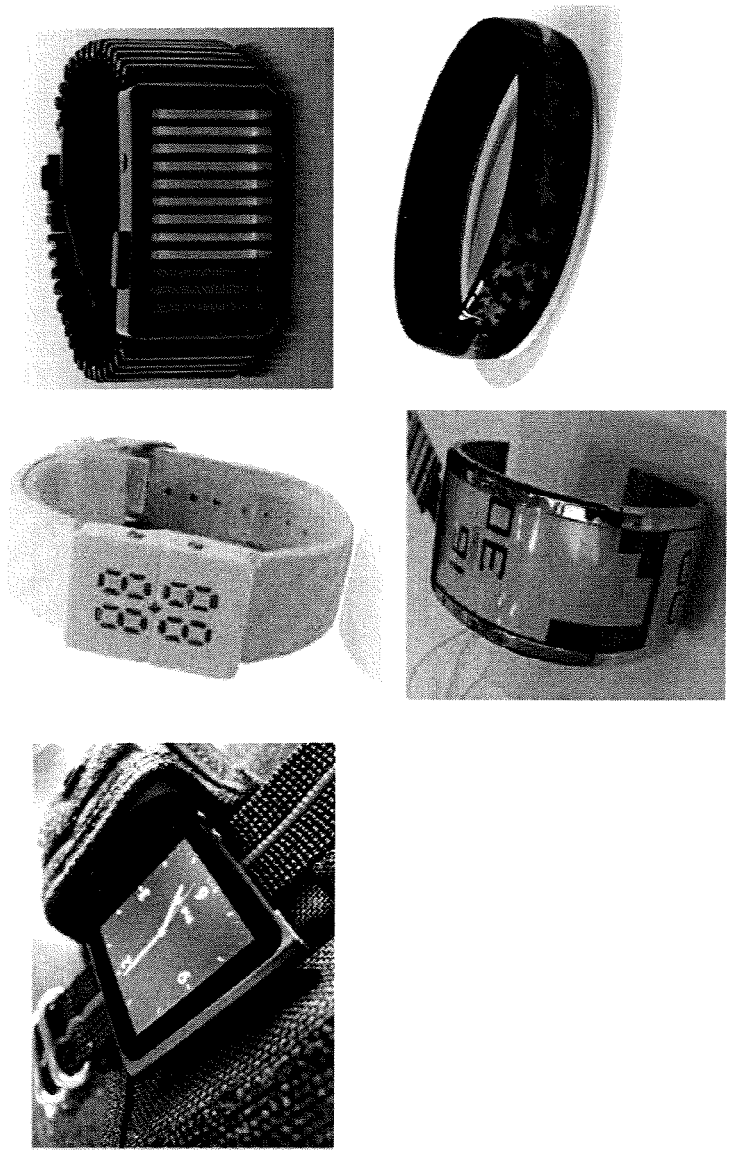
FIG. 16 depicts a variety of conventional wristwatches and bracelets having displays only on top surfaces.
Figure 17:
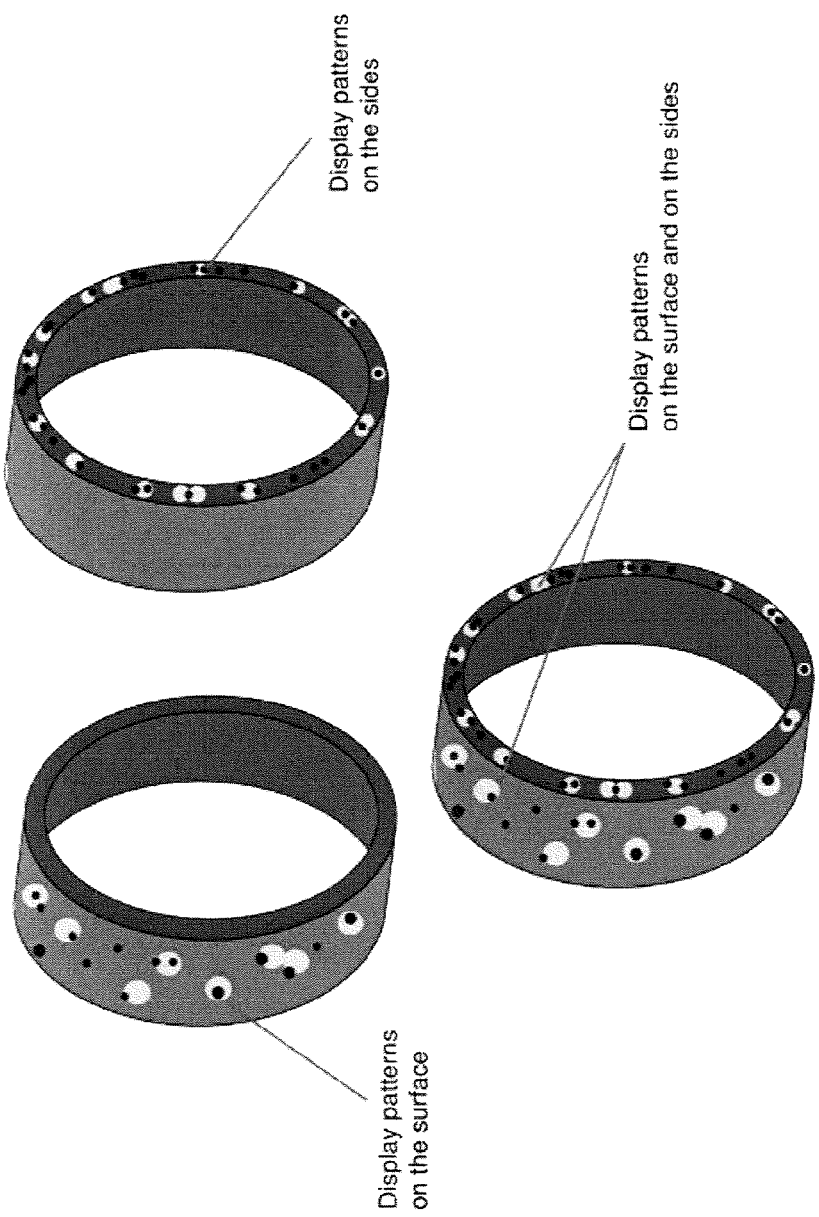
FIG. 17 depicts a tenth embodiment of a bracelet having a display that wraps around the outside surface of the bracelet, including the sides (i.e., edges) of the bracelet.

Referring now to FIGS. 16 and 17, the design of a bracelet according to one embodiment of the present disclosure allows displaying information all around the bracelet, including on the sides or edges of the bracelet. In FIG. 16, various wristwatches and bracelets are shown. None of the wristwatches and bracelets are capable of displaying information on the edges or sides of the wristwatches and bracelets.

In FIG. 17, the design of the bracelet according to one embodiment of the present disclosure allows using all parts of the bracelet, including the sides or edges of the bracelet, to display information. More specifically, the design of the bracelet according to the present disclosure provides a choice to display graphics on the surface, on the sides (i.e., along the edges), or on both parts of the bracelet. The design of the bracelet according to one embodiment of the present disclosure provides many advantages. For example, the design of the bracelet according to one embodiment of the present disclosure provides more freedom to create visual effects such as display one graphic pattern to indicate mood, display another graphic pattern to match clothes, and so on.

Eleventh Embodiment

Spreading Several Smaller Batteries Within a High-Tech Bracelet

Figure 18:
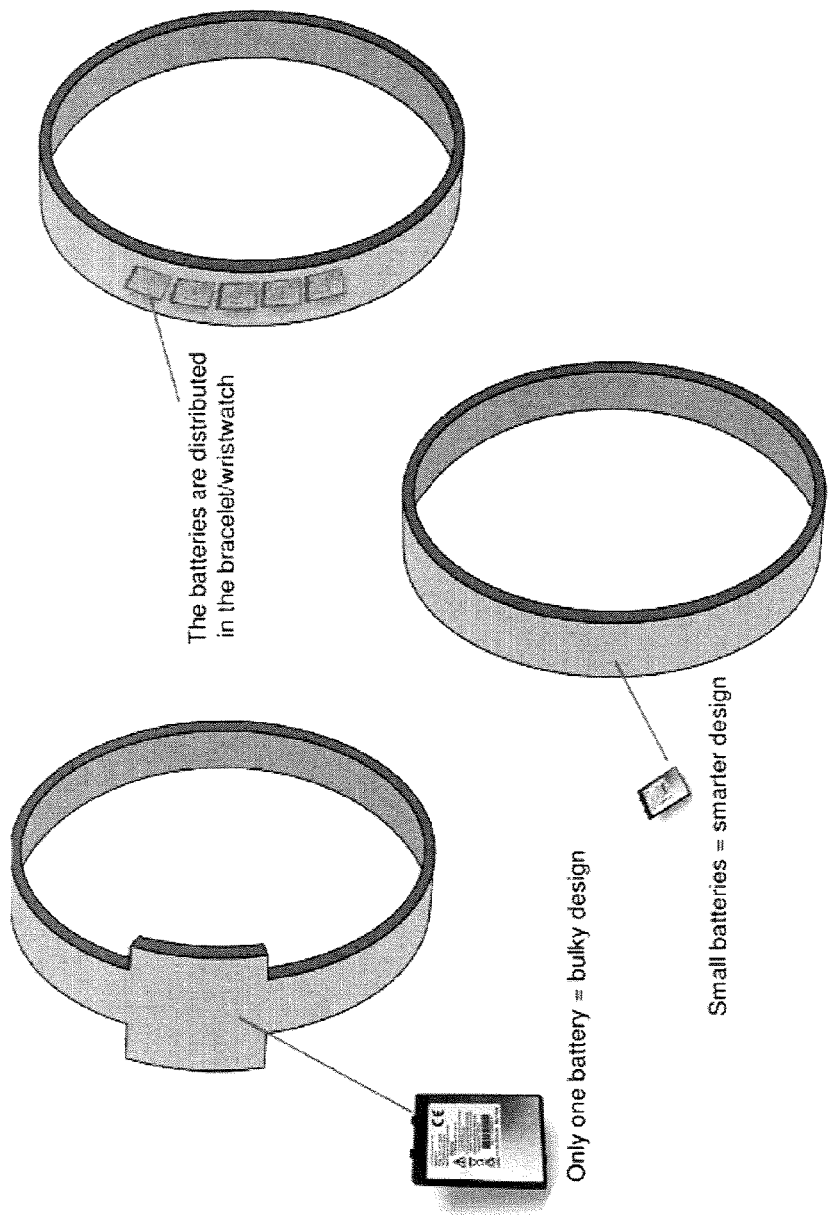
FIG. 18 depicts an eleventh embodiment of a bracelet having several batteries distributed throughout the bracelet.

Referring now to FIG. 18, the design of a bracelet according to one embodiment of the present disclosure allows spreading (i.e., distributing) several batteries throughout the bracelet instead of having a single, large battery, which can make the design of the bracelet bulky. Distributing several batteries through out the bracelet provides many advantages. For example, several batteries can power several circuits. Therefore, several circuits providing several functions can be integrated into the bracelet. Further, the several batteries can be small in size. Therefore, the bracelet can have a trendy and compact design while providing many functions using many circuits. Additionally, the small batteries can be of regular shape and size, and custom-shaped (e.g., contoured) batteries are unnecessary.

Twelfth Embodiment

Displaying Time All Around the Bracelet

Figure 19:
FIG. 19 depicts a variety of conventional wristwatches and bracelets that display time in a fixed manner at a central location on the wristwatches and bracelets.
Figure 20:
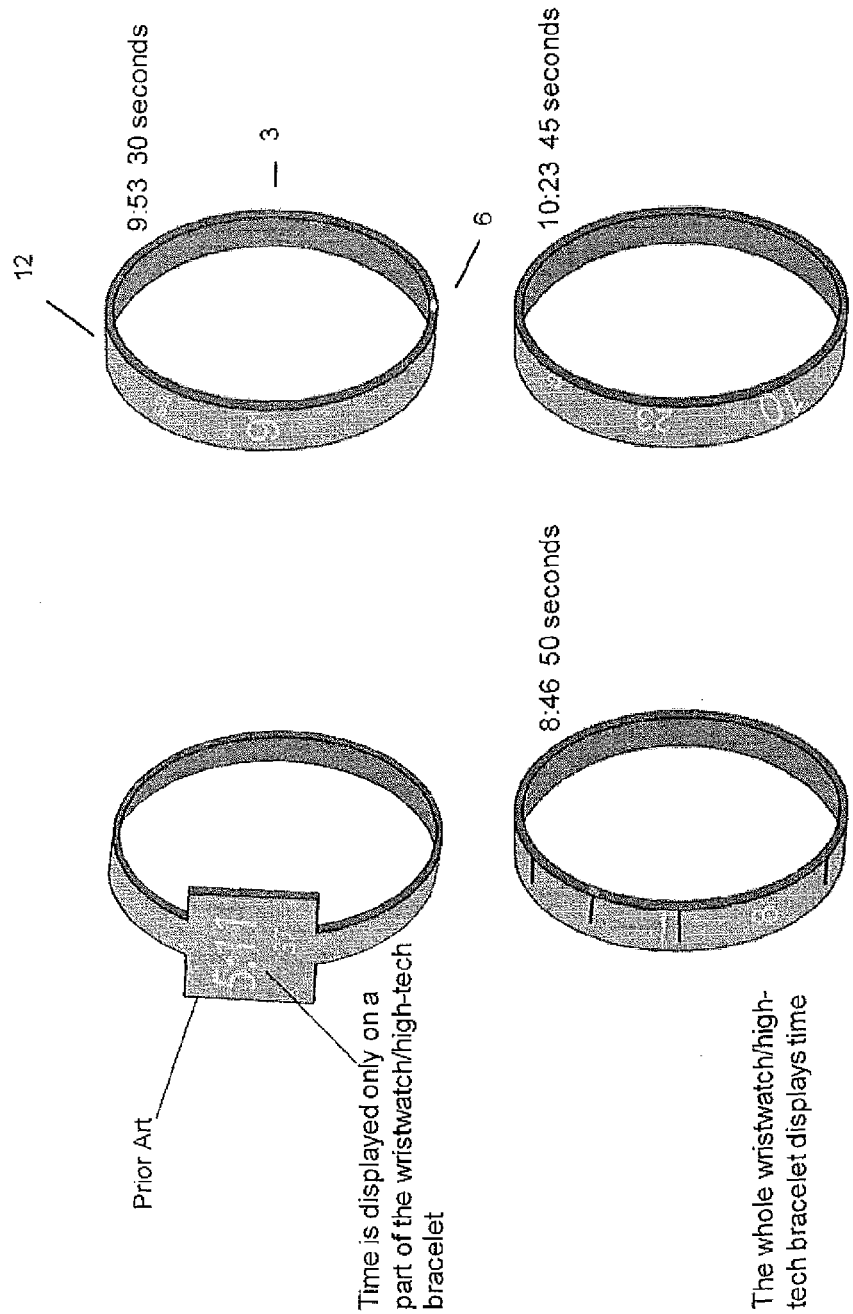
FIG. 20 depicts various embodiments of a bracelet.
Figure 22:
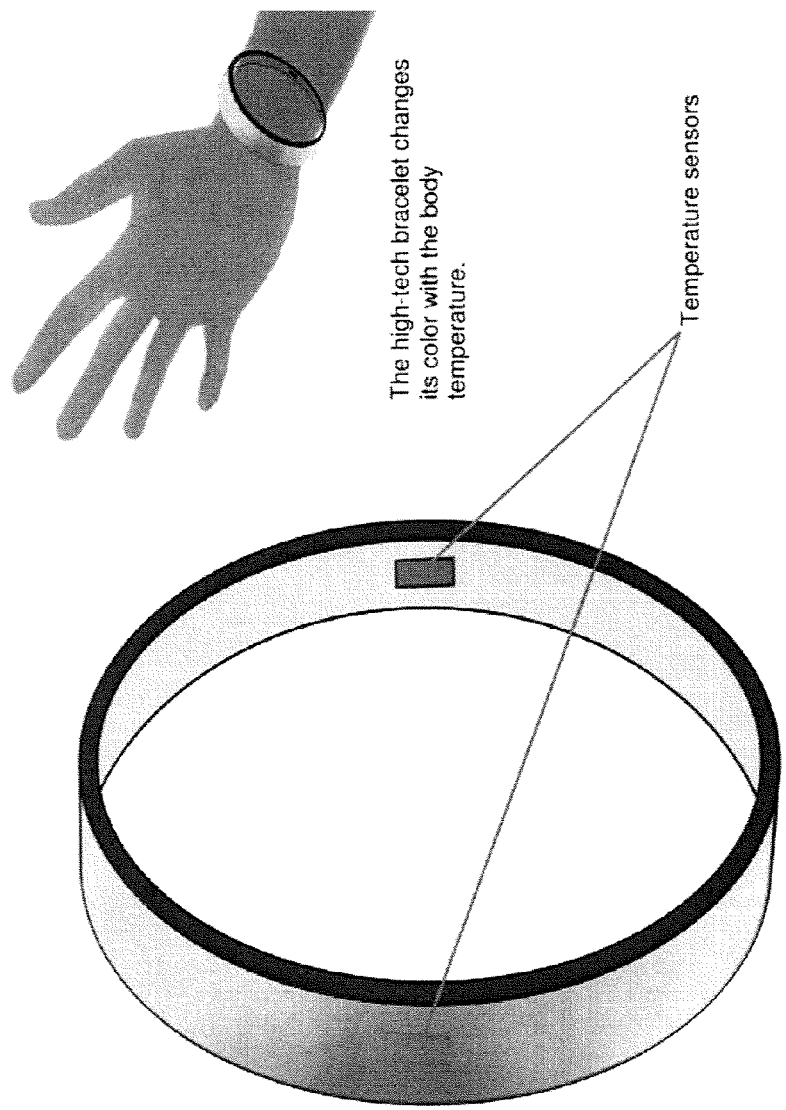
FIGS. 22 and 23 depict a fourteenth embodiment of a bracelet that changes a graphics pattern being displayed in response to changes in a body parameter of a user.

Referring now to FIGS. 19 and 20, the design of a bracelet according to one embodiment of the present disclosure allows displaying time all around the bracelet. In FIG. 19, most wristwatches and bracelets display time only at a central location. In FIG. 20, the bracelet according to the present disclosure can display time all around the bracelet. Specifically, the entire surface of the bracelet, including sides (i.e., edges) of the bracelet can be used to display time. Accordingly, time can be displayed on the bracelet in many ways as shown. Further, unlike in most wristwatches and bracelets, the manner in which the time is displayed on the bracelet can be changed. Therefore, the bracelet according to the present disclosure can be trendy and fashionable.

Thirteenth Embodiment

Bracelet with Changing Graphics/Design as a Function of Ambient Noise

Referring now to FIG. 21, a bracelet according to one embodiment of the present disclosure can use sounds or noise from the surrounding environment to influence graphics displayed on the bracelet. A bracelet according to one embodiment of the present disclosure includes a microphone that is embedded in the bracelet as shown. The microphone senses sounds in the surrounding environment. Based on the sounds sensed by the microphone, the bracelet creates different graphic patterns and displays the different graphic patterns on the bracelet. The graphics displayed on the bracelet can change according to the intensity of the sounds, noises, voices, and so on. For example, the color, pattern, and/or the rhythm of the graphic pattern can be changed according to the intensity of the sounds, noises, voices, and so on, as shown. Graphics can also be changed as a function of recognized (known or predetermined) voices or sounds.

The present disclosure is not limited sound as an input based on which the graphic pattern displayed on the bracelet can change. Other inputs can be used alone or in combination with sound input to change the graphic pattern displayed on the bracelet. For example, the other inputs may include, but are not limited to, ambient light sensed by a light sensor, ambient temperature sensed by a temperature sensor, and so on, embedded in the bracelet.

Further, in some implementations, the bracelet may vibrate in response to one or more of these inputs instead of, or in addition to, changing the graphic patterns displayed on the bracelet. In some implementations, the bracelet may include a speaker embedded in the bracelet that can be used to output sounds in response to one or more of these inputs instead of, or in addition to, changing the graphic patterns displayed on the bracelet.

Fourteenth Embodiment

High-Tech Bracelet with Changing Appearance as a Function of Body Parameters

Figure 23:
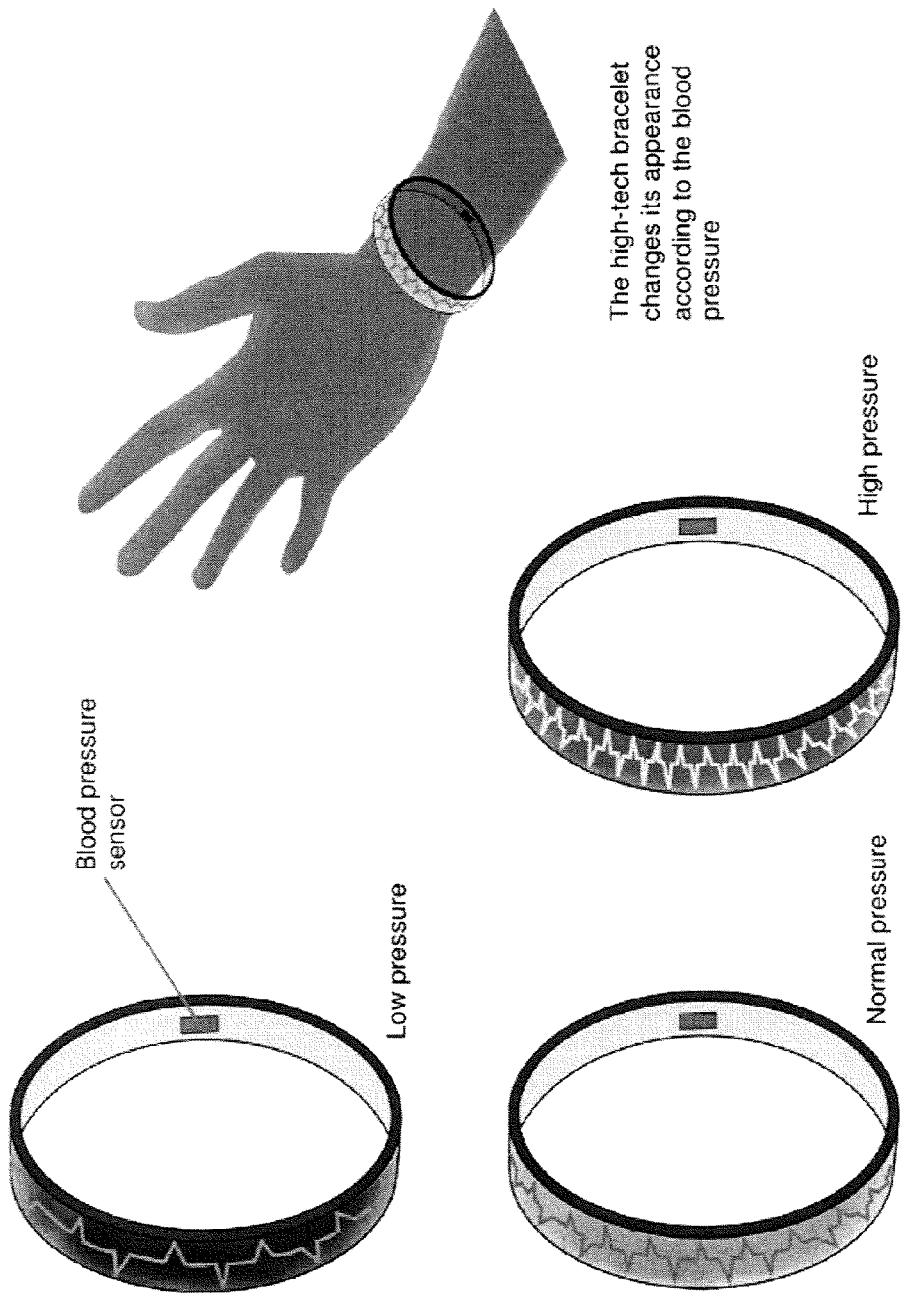

Referring now to FIGS. 22-25, a bracelet according to one embodiment of the present disclosure may include various sensors embedded in the bracelet to sense various body parameters of the person wearing the bracelet. For example, in FIG. 22, the sensors embedded in the bracelet may include a blood-pressure sensor, a body temperature sensor, a heart-rate (pulse) sensor, and so on. In FIG. 23, the bracelet can update graphic patterns displayed on the bracelet according to changes in the body parameters in real time.

Although capable, the bracelet does not display actual values of the body parameters. Instead, the bracelet indicates changes in values of the body parameters by changing characteristics of the graphic patterns displayed on the bracelet. For example, the color of the graphics pattern displayed around the entire bracelet may change according to the body temperature. As another example, the rhythm of the graphics pattern or animation displayed on the bracelet can change according to the heart rate, and so on.

Figure 24:
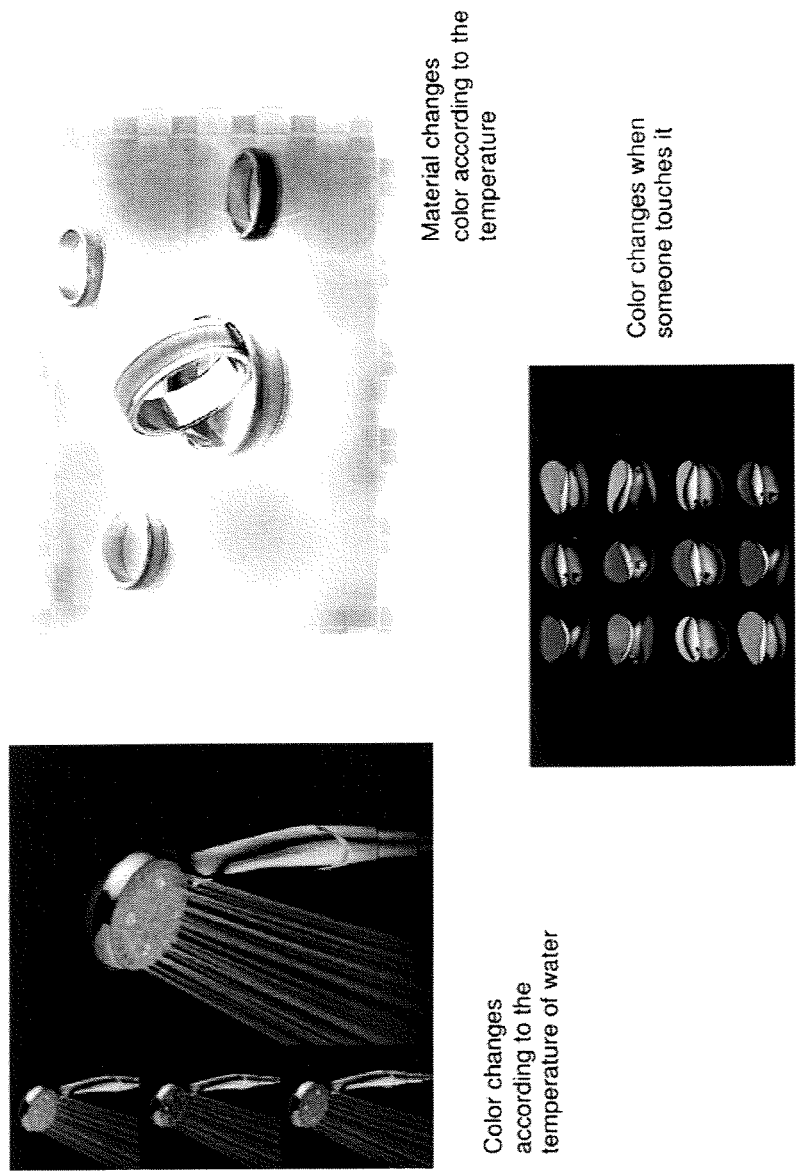
FIG. 24 depicts objects that change color in response to different stimuli.
Figure 25:
FIG. 25 depicts conventional wristwatches that display values of different body parameters of a user.

These capabilities of the bracelet are different than the abilities of some other objects shown in FIG. 24. For example, FIG. 24 shows objects that may change color according to the temperature of water, may change color according to the temperature of the object itself, or may change color in response to touching the object. In contrast, the bracelet electronically displays graphics patterns on displays all around the bracelet and changes the electronic properties such as color, rhythm, and so on, of the displayed graphics pattern in response to changes in one or more body parameters of the wearer of the bracelet. None of the devices shown in FIG. 25 has the capabilities of the bracelet either. For example, these devices display actual values of the body parameters of the person wearing the devices. Further, none of the devices shown in FIG. 25 can change a characteristic of a graphics pattern displayed all around the device in response to a change in a body parameter of the wearer of the device.

Fifteenth Embodiment

3D Enhanced High-Tech Bracelet

Figure 26:
FIG. 26 depicts conventional computing devices capable of displaying 3D graphics on a screen.
Figure 27:
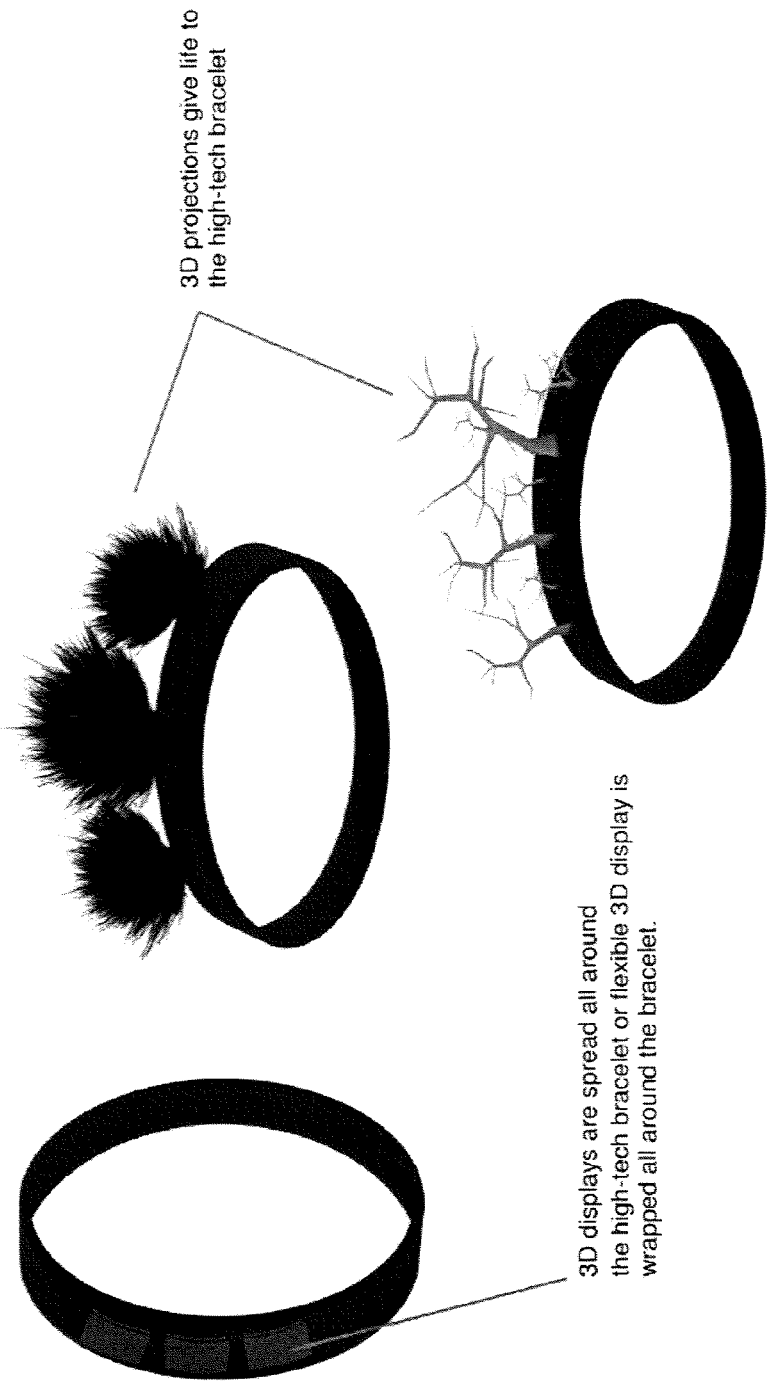
FIG. 27 depicts a fifteenth embodiment of a bracelet that includes one or more 3D displays.

Referring now to FIGS. 26 and 27, a bracelet having an embedded 3D projection technology to display 3D graphics according to one embodiment of the present disclosure is shown. In FIG. 26, generating 3D graphics generally requires complex computing equipment. In contrast, FIG. 27 shows the bracelet designed according to the present disclosure, which includes 3D displays spread all around the bracelet. Alternatively, a flexible 3D display may be wrapped all around the bracelet. The user can display 3D pictures all around the bracelet. The user can customize the bracelet with 3D graphics. The user can download different 3D graphics to the bracelet.

Sixteenth Embodiment

Data Entry Through Random Match of Display(s) and Sensors

Figure 30:
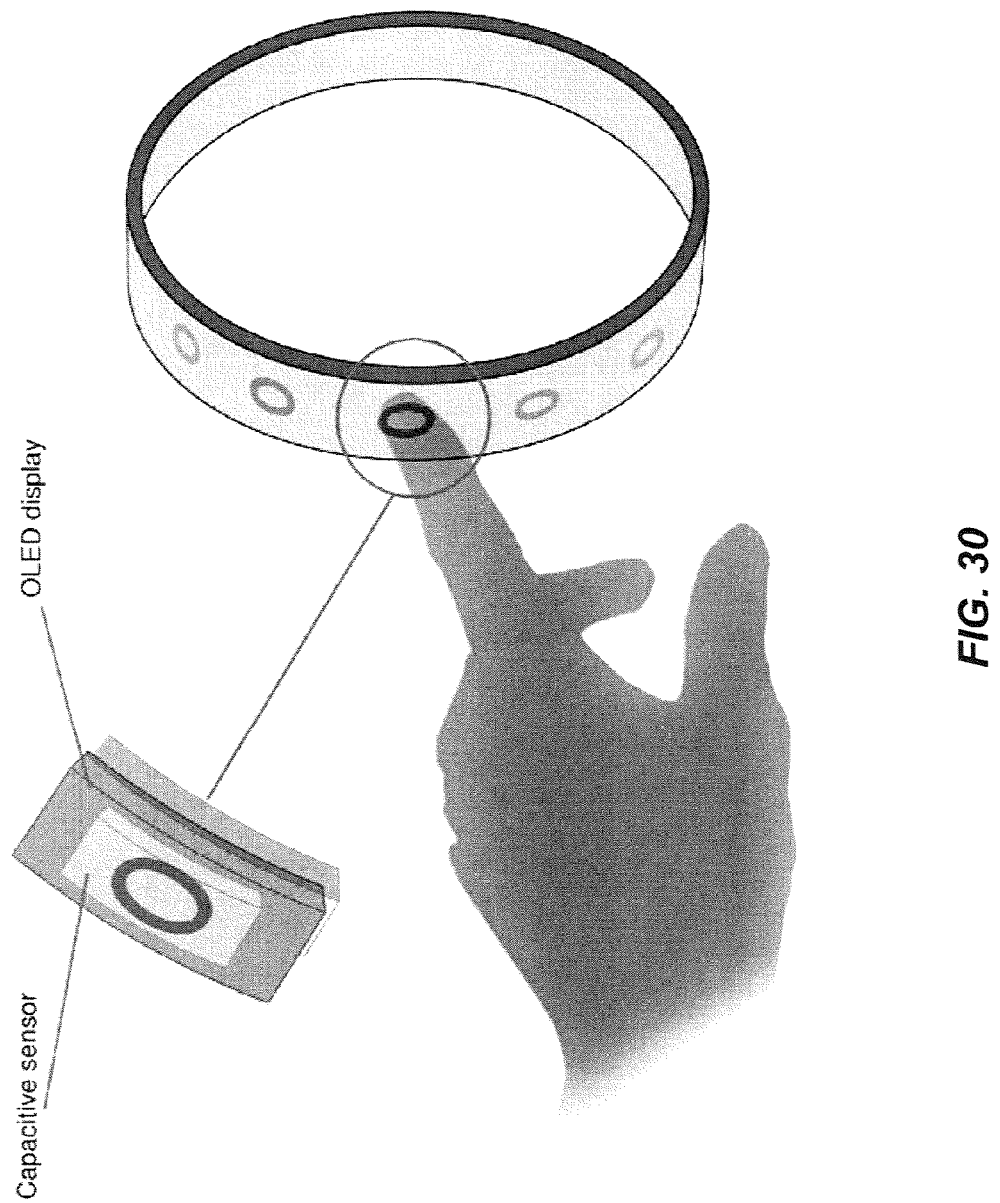

Referring now to FIGS. 28-30, the design of a bracelet according to one embodiment of the present disclosure provides displays and sensors embedded in the bracelet to enter pass-codes, passwords, or data to unlock, configure, or validate status in the bracelet. In FIG. 28, most devices use either large, bulky keyboards for such functions, or, to reduce the size of the keyboard, force the size of the keys so small that the keys are difficult to use. Moreover, the sequence of keys used can be observed by a third party, which can compromise security.

In contrast, the bracelet designed according to one embodiment of the present disclosure can perform these functions without using a large, bulky keyboard, and without forcing the keys to be too small to use. Since the bracelet is used as a companion device of another device such as the smartphone, most of the data may be entered more conveniently using the smartphone. Some data, however, such as a password to lock/unlock the bracelet needs to be entered from the bracelet. For example, since many security transactions can be performed using the bracelet (e.g., using the NFC function embedded in the bracelet), to secure against a lost or stolen bracelet, the user may configure the bracelet so that the user needs to enter a password to lock/unlock the bracelet. The bracelet provides displays and sensors that can be used to enter such data easily and securely.

In FIGS. 29 and 30, the bracelet may include LED/OLED displays and sensors to enter random security codes/passwords. The user may use any combination of colors, letters, and/or numbers to create and enter passwords. Further, unlike other devices, which have the keys in fixed positions, the displays on the bracelet can randomly display the colors, letters, and/or numbers of the passwords all around the bracelet. When a code needs to be entered, the display is adjusted or reconfigured to match with sensors randomly in order to be activated in a given sequence to enter the code. Accordingly, a third party observing the entry of a code cannot lock/unlock the bracelet by merely mimicking the positions where the user entered the code before. Thus, not using small keys enables easy data input, and random display of colors, letters, and numbers provides increased security.

Seventeenth Embodiment

Modular High-Tech Bracelet

Figure 31:
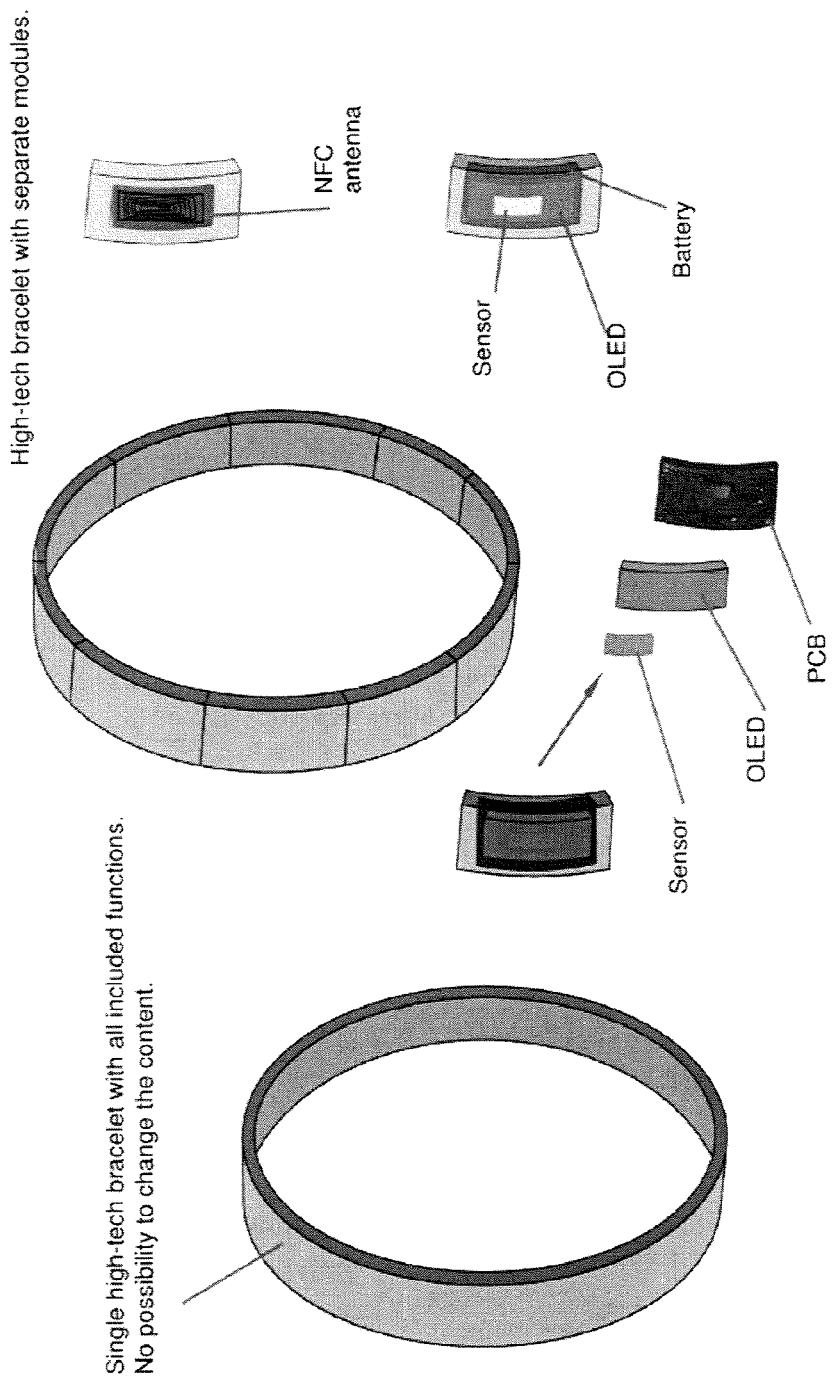
FIGS. 31-33 depict a seventeenth embodiment of a bracelet that includes several modules that can be used to build bracelets having different functions and different sizes.
Figure 32:
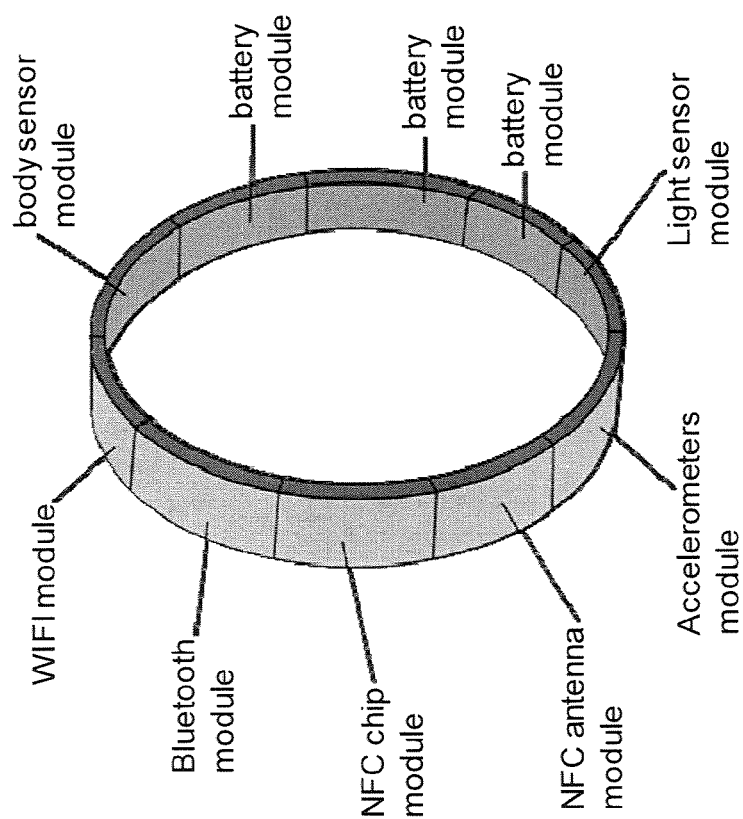
Figure 33:
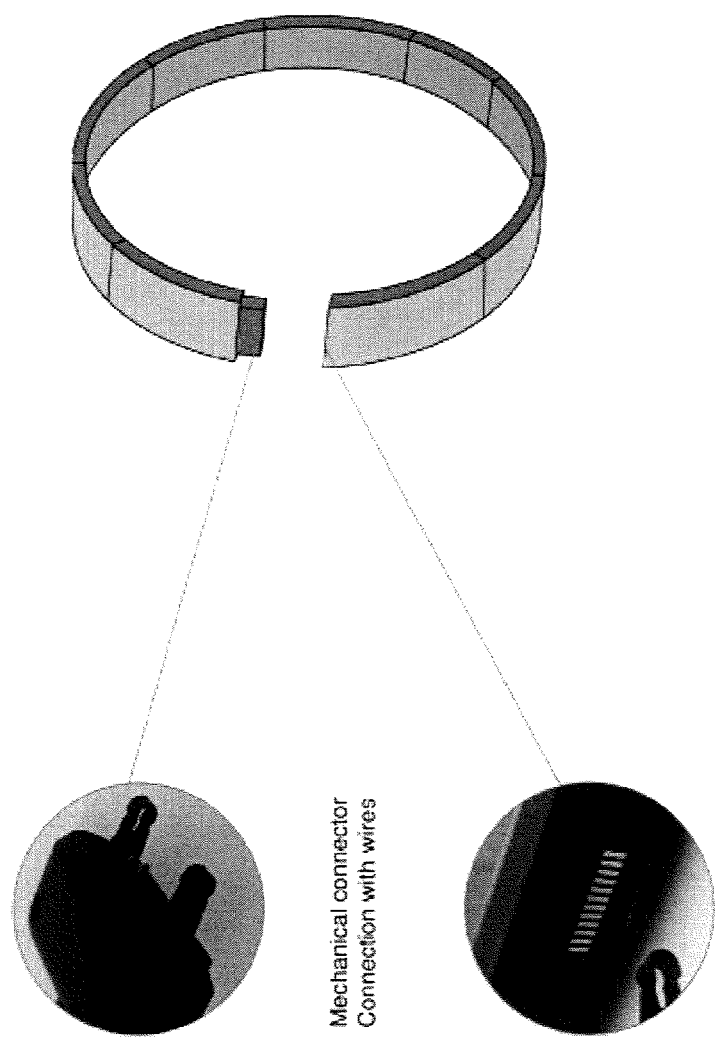

Referring now to FIGS. 31-33, a modular high-tech bracelet according to one embodiment of the present disclosure is shown. Most devices such as wristwatches and bracelets cannot be customized by adding functions as needed. The only custom features provided by these devices include choice of color and material used to manufacture these devices. Further, while different designs are available, the designs are fixed and cannot be changed or upgraded as needed. In contrast, the modular design of the bracelet according to the present disclosure allows users to customize and personalize the bracelet in terms of cost and functions.

In FIG. 31, an electronic bracelet/wristwatch according to one embodiment of the present disclosure may be manufactured by assembling various modules. In FIG. 32, the user can assemble the bracelet by plugging together a selection of modules according to the cost and functions desired by the user. In FIG. 33, each module may have a connector to connect to another module. A mechanical connector is shown for example only. Instead, a magnetic connector may be used as described before.

As shown in FIG. 31, each module can include a functionality either partially or wholly. For example, a power supply module can include a battery, an OLED display, and sensor. As another example, the NFC function can be spread over two modules: one module may include the NFC antenna while another module may include the circuit that performs the NFC functions using the NFC antenna. Any combination of functions may be incorporated in each module.

Modules can be added or removed at any time to reconfigure the bracelet. The modularity of the bracelet allows the user to change the size of the bracelet to fit the wrist. The cost of the bracelet can also be adjusted (customized) since each module can have a different price depending on the functionality implemented by the module.

The modularity of the bracelet provides the bracelet a personal touch. Each module has an identity and a function associated with the module. The user can select and buy only the desired functions. Further, the user can remove a module not used daily and add the module when desired. The user can also change the combination of modules to have the desired functionality and still have the bracelet fit around the wrist.

Depending on the functional modules desired by the user in the bracelet, the user can also add one or more interconnecting modules to the bracelet. An interconnecting module connects two modules of the bracelet. The interconnecting module may or may not provide other functions. For example, the interconnecting module may only include OLEDs and a touch sensor.

In the remainder of the present disclosure, some examples of circuits that can be used in the bracelet are provided. The circuits described below provide only examples of implementations of the bracelet. The circuits described below can implement one or more of the embodiments described above in a single bracelet. The circuits, while occasionally shown in modular form, need not be modular. Instead, the bracelet may be a single contiguous unit, and the circuits may be spread within the bracelet. Modularity, where shown, is shown only to aid understanding how the circuits can operate and provide the functionality even when some other circuits may be added or removed in the modular embodiment.

As described above, the present disclosure relates to an electronic bracelet (bracelet) that can be used as a companion device of a smartphone. The bracelet can include a wireless communication circuit such as a Bluetooth™ (BT) circuit operable to communicate with the smartphone. The bracelet can include additional circuits that provide additional functions by utilizing the processing and storage capabilities of the smartphone.

For example, the bracelet can include a near-field communication (NEC) circuit that authenticates transactions and exchanges identifying information of the person wearing the bracelet via a NEC antenna in the bracelet. The bracelet can also include devices such as an accelerometer, a gyroscope, an electronic compass, and a global positioning system (GPS) circuit to detect gestures. The gestures can be used to control functions of the bracelet and functions of a device associated with the bracelet. The bracelet can include one or more batteries that are distributed around the bracelet. The batteries can be charged via the NFC antenna instead of using cables and connectors.

The bracelet can include display devices such as organic light-emitting diodes (OLEDs), LEDs, liquid crystal displays (LCDs), and/or plasma displays that are distributed around the bracelet to display time, graphics, and other data. Throughout the disclosure, OLEDs are used for example only. Different display devices, alone or in combination, may be used instead.

The bracelet can include sensors that sense biometric data such as temperature, pulse, and blood-pressure, which can be used to display different patterns on the OLEDs. The bracelet can include additional sensors such as microphones and light sensors that sense environmental data related to the environment around the bracelet, which can be used to display different patterns on the OLEDs.

The user can download applications via the smartphone or other devices such as laptop computers. The applications can be customized according to the configuration of the bracelet to utilize various features of the bracelet. The applications can be executed partly or wholly by the smartphone and/or the bracelet by leveraging the processing and storage capabilities of the smartphone.

The bracelet can be modular. The user can add/remove modules to add/remove functionality as desired. Interconnecting modules can be inserted between the modules to increase or decrease the size of the bracelet. A single module can include one or more functions such as an OLED-based display, a battery, and a capacitive sensor. Modularity allows the user to adjust the size of the bracelet according to wrist size. These and other features of the bracelet are described below in detail.

Figure 34B:
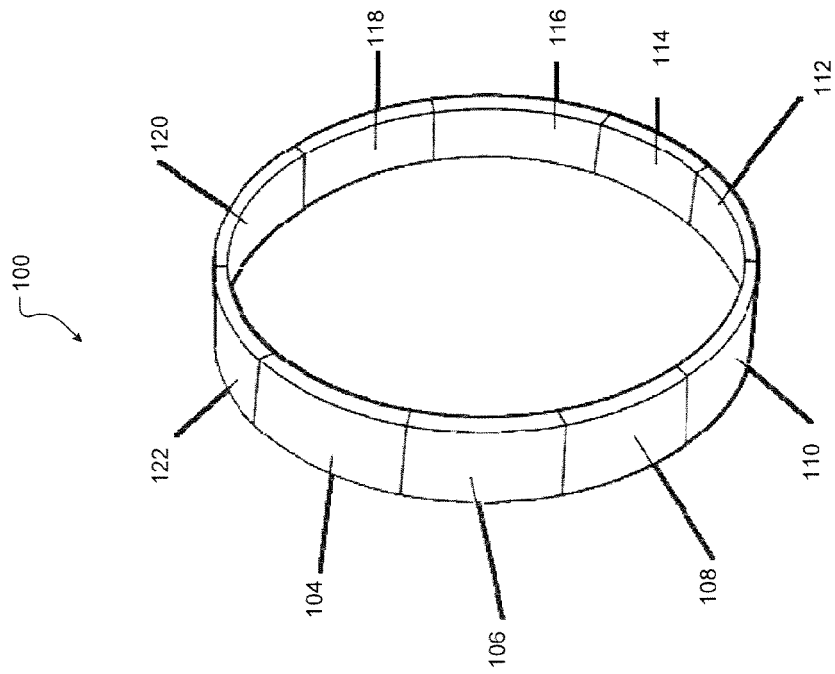
FIG. 34B depicts various circuits of the bracelet in accordance with one implementation.
Figure 34A:
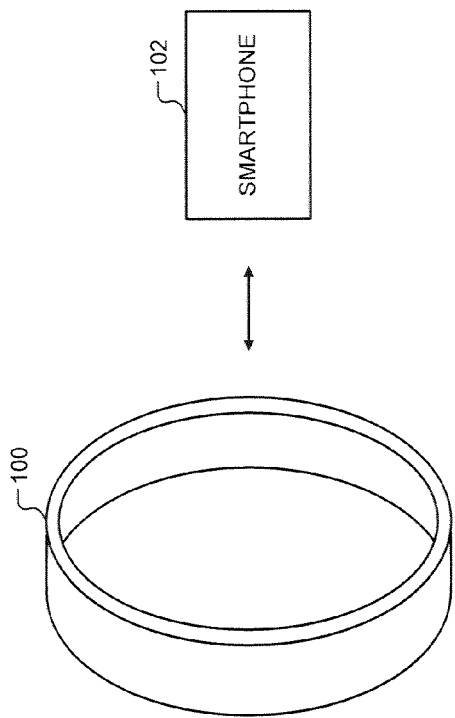
FIG. 34A is a schematic of a bracelet in communication with a smartphone.

Referring now to FIGS. 34A and 34B, a bracelet 100 according to the present disclosure is shown. In FIG. 34A, the bracelet 100 communicates with a smartphone 102 wirelessly using a short-range wireless communication protocol such as Bluetooth® (BT) or WiFi. Throughout the disclosure, BT is used for example only. Different short-range wireless communication protocols, alone or in combination, may be used instead.

In FIG. 34B, the bracelet 100 can include a plurality of circuits. For example, the bracelet 100 can include a BT circuit 104, a near-field communication (NFC) circuit 106, an NFC antenna 108, a first power supply circuit (including a first batte) 110, a first sensor circuit (e.g., a light sensor circuit) 112, a second power supply circuit (including a second battery) 114, a second sensor circuit (e.g., a sound sensor circuit) 116, a third power supply circuit (including a third battery) 118, a third sensor circuit (e.g., a gesture sensor circuit) 120, and a wireless communication circuit (e.g., a WiFi circuit) 122. The operation of these circuits is explained below.

One or more of these circuits may be omitted and/or one or more additional circuits may be added according to the needs of the user. When the bracelet 100 is modular, one or more of these circuits can be integrated into one or more modules as explained below. Instead of or in addition to these modules, one or more interconnecting modules (explained below) may be inserted into the bracelet 100. Further, these modules may be arranged in a different order than the order shown.

Figure 35A:
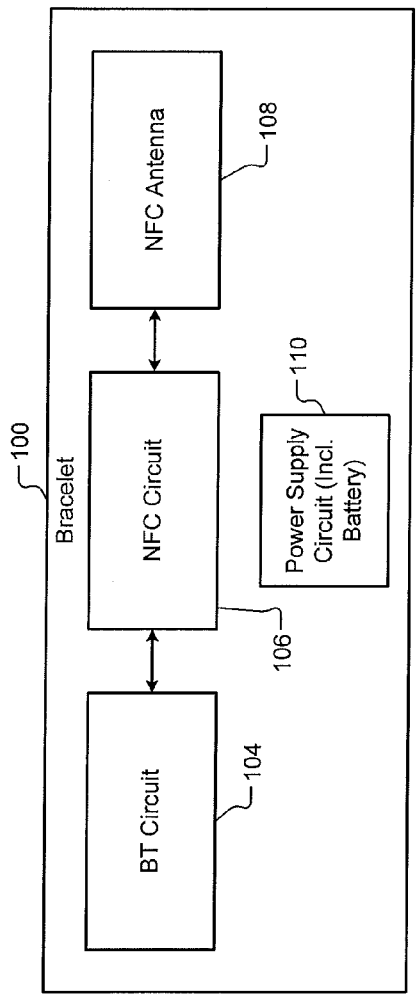
FIG. 35A is a functional block diagram of a bracelet.
Figure 35C:
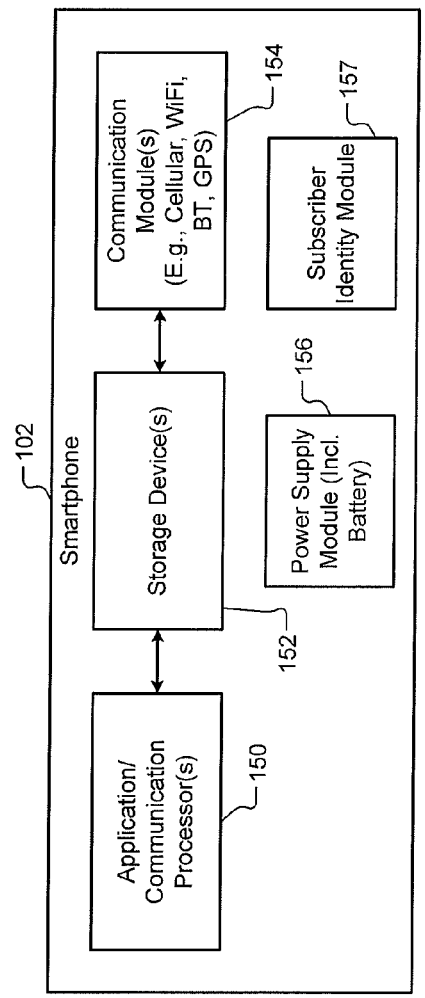
FIG. 35C is a functional block diagram of a smartphone.

Referring now to FIGS. 35A-35C, examples of functional block diagrams of the bracelet 100 and the smartphone 102 are shown. In FIG. 35A, for example, the bracelet 100 can include the BT circuit 104, the NFC circuit 106, the NFC antenna 108, and the first power supply circuit (including the first battery) 110. The BT circuit 104 communicates with the smartphone 102. The NEC circuit 106 can communicate with an external device (e.g., an automatic teller machine or another bracelet) via the NFC antenna 108.

The NFC circuit 106 can exchange authentication and identification information of the user of the bracelet 100 with the external device via the NFC antenna 108 to authenticate transactions (e.g., banking transactions) performed by the user. The authentication and identification information may include information stored in a subscriber identity module of the smartphone 102 (see element 157 in FIG. 35C). Further, the user wearing the bracelet 100 can exchange personal contact information (e.g., email and phone information) via the NFC antenna 108 while shaking hands with another user also wearing a bracelet.

In FIG. 35B, for effective communication, the NFC antenna 108 may be located and/or shaped distinctively in the bracelet 100. For example, the NFC antenna 108 may have a distinctive shape as shown. An oval shape is shown for example only. Any other shape may be used instead. In some implementations, a distinctive shape may not be used. Instead, for effective communication, the NFC antenna 108 may be located, for example, at an end-point or center of the bracelet 100.

The first power supply circuit 130 supplies power to the BT circuit 104 and the NEC circuit 106. Additional power supply circuits (e.g., the second power supply circuit 114 and the third power supply circuit 118 shown in FIG. 34B) may be included in the bracelet 100 to supply power to other circuits of the bracelet 100. Using multiple power supply circuits (and multiple batteries) allows using several small batteries instead of using a single large, bulky battery.

The NFC antenna 108 may also be used to receive power from a power source through inductive coupling. The power received from the power source via the NFC antenna 108 may be used to charge the batteries of the bracelet 100. Accordingly, the batteries of the bracelet 100 can be charged without using any cables and connectors. Alternatively, when the bracelet 100 is modular, the batteries of the bracelet 100 can be charged using a powering module that connects to one of the circuits of the bracelet 100 and that includes a suitable cable (e.g., a USB cable) that plugs into a power source.

In FIG. 35C, the smartphone 102 includes one or more processors (e.g., application and communication processors) 150, one or more storage devices (e.g., solid-state disks) 152, one or more communication modules (e.g., a cellular module, a BT module, a WiFi module, and a GPS module) 154, and a power supply module (including a battery) 156. The application and communication processors 150 respectively process application-related and communication-related data. The storage devices 152 store data.

The one or more communication modules 154 communicate with different devices using respective communication protocols. For example, the BT module communicates with BT-compatible devices including the bracelet 100. The cellular module communicates with one or more cellular towers. The WiFi module communicates with a WiFi network. The power supply module 156 supplies power to the one or more processors 150, the one or more storage devices 152, and the one or more communication modules 154.

Figure 36A:
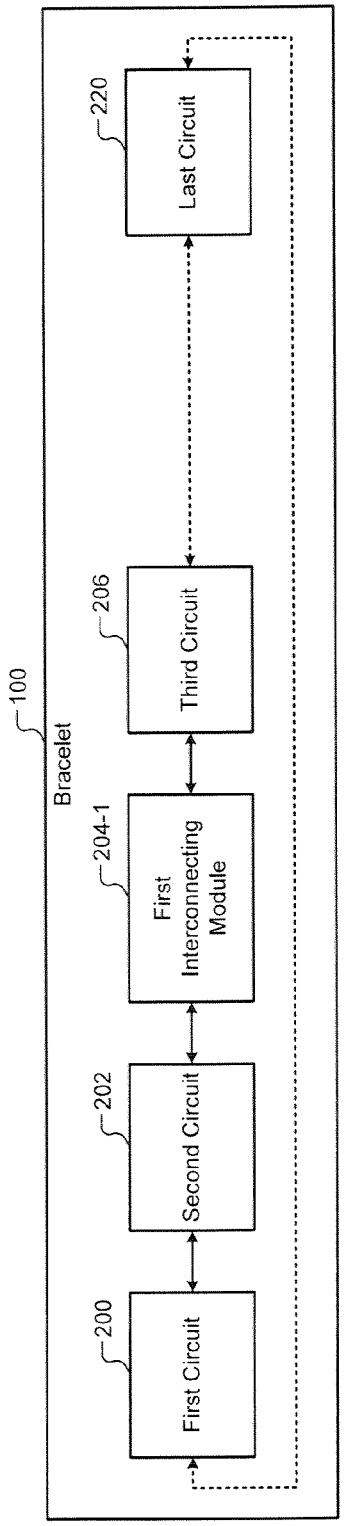
FIG. 36A is a detailed functional block diagram of a bracelet.
Figure 36B:
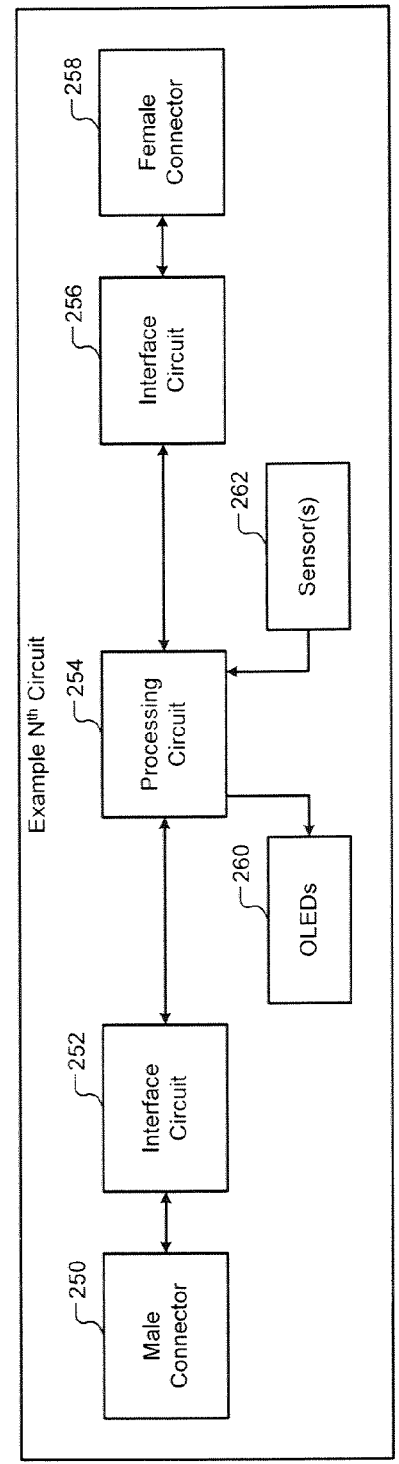
FIG. 36B is a functional block diagram of a circuit of a bracelet in accordance with one implementation.

Referring now to FIGS. 36A and 36B, a general functional block diagram of the bracelet 100 is shown. In FIG. 36A, the bracelet 100 can include a plurality of circuits connected in series as shown. The plurality of circuits can include, in general, a first circuit 200, a second circuit 202, a third circuit 206, ..., and a last circuit 220. The first circuit 200, the second circuit 202, the third circuit 206, ..., or the last circuit 220 is generally referred to as an $N^{th}$ circuit throughout the disclosure.

When the bracelet 100 is modular, one or more of the plurality of circuits may be implemented in one or more modules. Further, one or more interconnecting modules such as a first interconnecting module 204-1, a second interconnecting module 204-2 (not shown, collectively interconnecting modules 204), and so on may be used to interconnect the one or more modules of the bracelet 100.

The bracelet 100 can include additional (or fewer) $N^{th}$ circuits and additional (or no) interconnecting modules 204 depending on the configuration and features selected by the user. Any of the $N^{th}$ circuits can include one or more of the circuits shown in FIG. 34B. When the bracelet 100 is modular, the last circuit 220 can be connected to the first circuit 200 directly, via the interconnecting module 204, or via a locking module (described below). In some implementations, the last circuit 220 may not be connected to the first circuit 200 (e.g., see FIG. 35B).

In FIG. 36B, an example of the $N^{th}$ circuit is shown. The $N^{th}$ circuit can include an interface circuit 252, a processing circuit 254, and an interface circuit 256. Additionally, the $N^{th}$ circuit can include OLEDs 260 and one or more sensors 262. When the bracelet 100 is modular, the Nth circuit may also include a male connector 250 and a female connector 258. The male connector 250 of one $N^{th}$ circuit connects to the female connector 258 of another $N^{th}$ circuit. The male connector 250 and the female connector 258 may be magnetic (i.e., may include magnets).

The interface circuits 252 and 256 provide a suitable interface for interfacing the circuits of the bracelet 100. For example, the interface circuits 252 and 256 may provide power and data transmission lines for supplying power and for communicating data from one circuit to another circuit of the bracelet 100. The interface circuits 252 and 256 may include suitable terminations for balancing the transmission lines.

One of the interface circuits 252 and 256 may assign an identifier (ID) to an $N^{th}$ circuit (or an interconnecting module or a locking module) as each circuit is added to the bracelet 100. For example, the first circuit 200 may be assigned an ID 1; the second circuit 202 may be assigned an ID 2, the first interconnecting module 204-1 may be assigned an ID 3; and so on. These identifiers can be retained or changed dynamically when the bracelet 100 is modular and the modules of the bracelet 100 are rearranged by the user. The user can select which circuit or module can have an ID of 1 (e.g., using the smartphone 102 or using a capacitive sensor on the module), and then remaining circuits or modules configure themselves when added.

The IDs may be included in the signals transmitted by each circuit of the bracelet 100. Further, if one of the circuits transmits a signal to another circuit, the ID of the receiving circuit may be included in the signals. Such a signaling scheme can help, for example, in displaying different graphic patterns on the displays of different circuits, or when a sensor on one circuit senses a condition that requires a device (e.g., a display, a speaker, or a vibrator) on another circuit to react to the condition. These and other similar operations are described below in detail.

The processing circuit 254 performs processing related to the function(s) performed by the $N^{th}$ circuit. For example, if the $N^{th}$ circuit is the BT circuit 104, the processing circuit 254 performs BT processing; if the $N^{th}$ circuit is the NFC circuit 106, the processing circuit 254 performs NFC processing; and so on. The processing circuit 254 can perform multiple functions if the $N^{th}$ circuit includes more than one of the circuit of the bracelet 100. For example, if the $N^{th}$ circuit includes the BT circuit 104 and a WiFi circuit, the processing circuit 254 can perform BT processing and WiFi processing.

When OLEDs 260 are used, the processing circuit 254 includes a display circuit to control the OLEDs 260. The OLEDs 260 can be controlled using an application downloaded via the smartphone 102 or another external device (e.g., a laptop). The OLEDs 260 can also be controlled based on a variety of conditions and data sensed by different sensors as explained below.

Figure 37B:
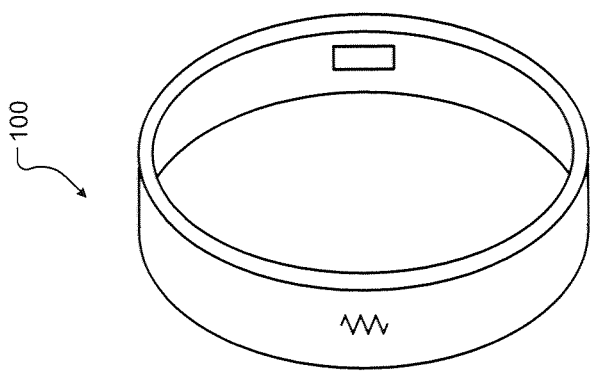
FIG. 37B depicts a bracelet having a sensor and displaying a graphic pattern.
Figure 37A:
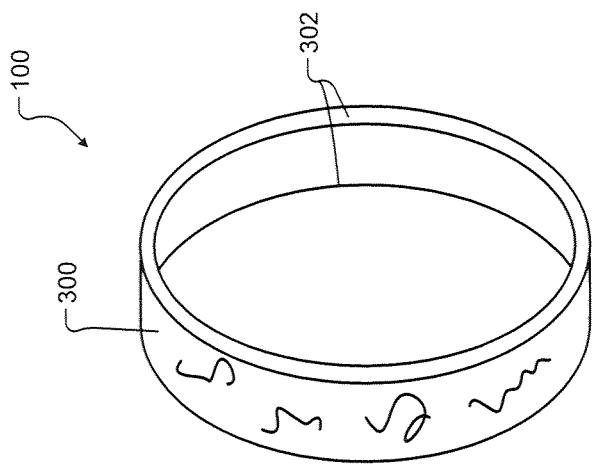
FIG. 37A depicts a bracelet displaying a graphic pattern.

Referring now to FIGS. 37A-37E, the OLEDs 260 may be distributed throughout the bracelet 100. For example, when the bracelet 100 is modular, the OLEDs 260 may be distributed on a plurality of modules of the bracelet 100. In FIG. 37A, the OLEDs 260 may be distributed on an outer surface 300 of the bracelet 100. Additionally, the OLEDs 260 may be distributed on one or both side surfaces 302 of the bracelet 100.

The OLEDs 260 may be used to display time in different ways. For example, the hours and minutes may be displayed on the outer surfaces 300 at two different locations (e.g., of two different modules when the bracelet 100 is modular) while the seconds may be displayed by lighting one of the OLEDs 260 per second on one or both of the sides surfaces 302 of the bracelet 100. Other ways of displaying time are contemplated.

Additionally, the OLEDs 260 can be used to display different graphic patterns as shown in FIGS. 37A and 37B. The OLEDs 260 can also be used to display three-dimensional (3D) images as shown in FIGS. 37C (e.g., a helix) and 37D (e.g., a tree).

Figure 37E:
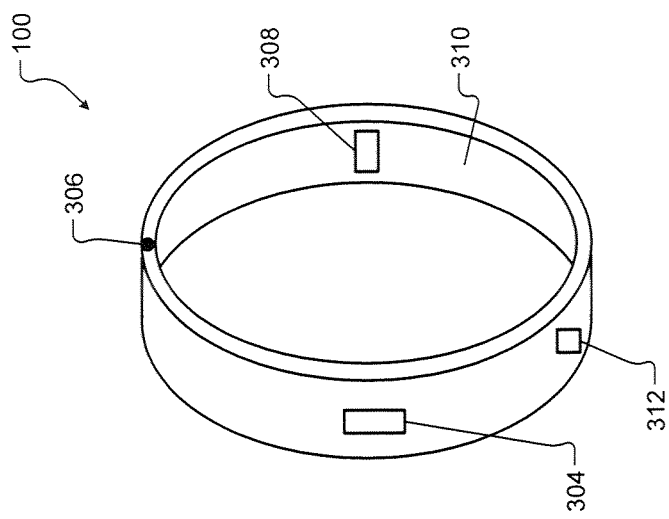
FIG. 37E depicts a bracelet having a plurality of sensors.
Figure 37D:
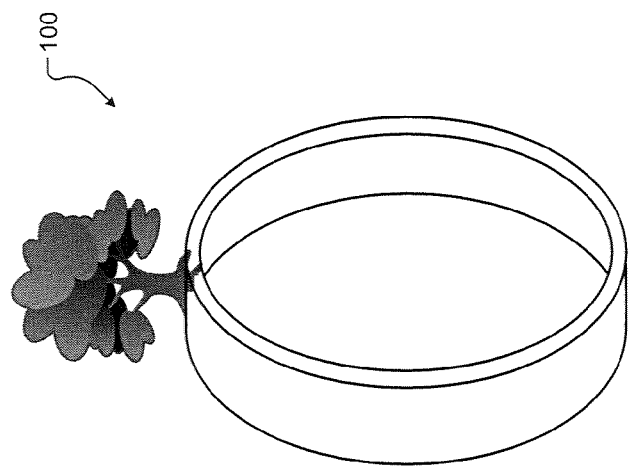
FIGS. 37C and 37D depict a bracelet displaying 3-dimensional graphic patterns.
Figure 37C:
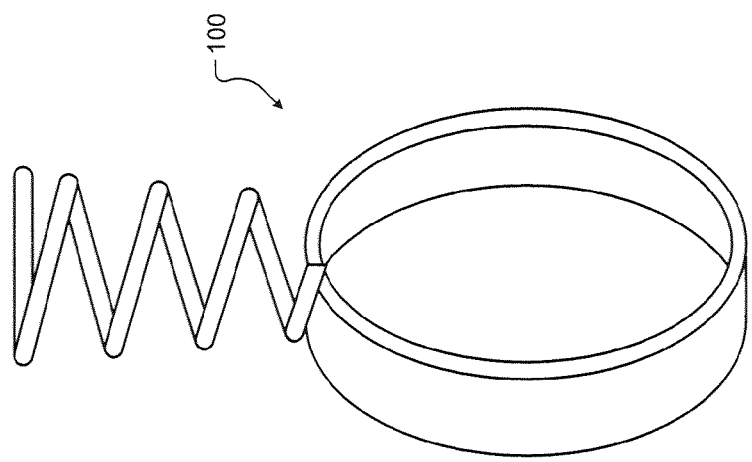

In FIG. 37E, the one or more sensors 262 may include one or more environmental sensors and biometric sensors. For example, the environmental sensors may include a light sensor, an ambient temperature sensor (both shown generally at 304), and a sound sensor (e.g., a microphone, shown generally at 306). These environmental sensors may be located on the outer and/or side surfaces 300, 302 of the bracelet 100 to sense environmental data of the environment around the bracelet 100.

The biometric sensors may include a pulse sensor, a body temperature sensor, and/or a blood-pressure sensor (generally shown at 308)). These biometric sensors may be located on an inner surface 310 of the bracelet 100 (proximate to the skin of the wearer of the bracelet 100) to sense biometric data of the user wearing the bracelet 100.

The environmental sensors may sense environmental data surrounding the bracelet 100 such as ambient light, ambient temperature, and sound (e.g., music, clapping or snapping of fingers by the wearer of the bracelet 100). The biometric sensors may sense biometric data of the wearer of the bracelet 100 (e.g., pulse rate, blood-pressure, body temperature, and so on). The OLEDs 260 can be turned on or off (or dimmed or brightened) depending on these data. The OLEDs 260 can display different graphic patterns based on these data.

For example, the OLEDs 260 may be turned on or off, or dimmed, or brightened when the ambient light crosses a predetermined threshold. The display patterns may flash at a predetermined frequency based on different ambient light/sound/temperature conditions. Further, the bracelet 100 can transmit a signal to a device to control (e.g., turn on or off) the device based on a clap or snap of fingers by the wearer of the bracelet 100.

Additionally, the OLEDs 260 may display a pattern resembling an electrocardiogram when the pulse rate or blood-pressure is normal (within a predetermined range) or crosses a predetermined threshold. In other words, values of sensed biometric parameters are not displayed on the OLEDs 260. Rather, a graphic pattern is displayed on the OLEDs 260 based on the sensed biometric parameters. The display patterns may flash at a predetermined frequency based on different biometric conditions. Alternatively or additionally, an alarm may sound via a speaker on the bracelet 100 when a biometric parameter is above or below a predetermined threshold.

Further, in FIG. 37E, the one or more sensors 262 may include one or more gesture sensors (e.g., accelerometers, a gyroscope, an electronic compass, and/or a GPS circuit, generally shown at 304, 308, and 312). For example, an electronic compass may be located at 312, and the accelerometers may be distributed in one or more of the $N^{th}$ circuits and may be arranged orthogonal to each other (e.g., at 304 and 308). The gesture sensors may be used to detect gestures made by the wearer of the bracelet 100. For example, the gesture sensors may detect movements of hand, fingers, and arm of the wearer of the bracelet 100. These movements can be translated into actions.

For example, information provided by the accelerometers and the electronic compass can be used to define spatial orientation and/or motion of the arm. Specifically, two orthogonal accelerometers can provide a 3D indication of where the arm is pointing, and in addition, the electronic compass can provide the direction in which the arm is pointing. This allows turning the bracelet 100 into a pointing device, a laser pointer, or a remote control.

One or more circuits of the bracelet 100 can include a device generating a signal suitable for performing the function of a pointing device, a laser pointer, or a remote control. For example, one or more circuits of the bracelet 100 can include a laser beam generator circuit to generate a laser beam, an infrared circuit to generate an infrared beam, and so on. To activate a cursor or pointer, or to initiate a remote control action, the user can perform predefined motions using the wrist or fingers, for example. Alternatively, the microphone in one of the circuits of the bracelet 100 can capture sound of snapping fingers, for example, to initiate an action.

Accordingly, when making a power-point presentation using a laptop and a projection screen, the user wearing the bracelet 100 can initially perform a calibration procedure as follows. The user can point the hand wearing the bracelet 100 to the upper left and bottom right corners of the projection screen, for example. Using an application on the smartphone 102 (or the laptop) and information from the gesture sensors, the spatial orientations of the hand pointing to the upper left and bottom right corners of the projection screen are determined. Subsequently, using these spatial orientations as reference and the information received from the gesture sensors as the hand is moved to point at a location on the projection screen, the pointed location on the projection screen can be determined. A pointer (e.g., a laser beam) can be transmitted from the bracelet 100 to the pointed location on the projection screen.

The user can also twist the hand wearing the bracelet 100 to move to a next or a previous slide. For example, rotating the hand wearing the bracelet 100 once clockwise may move the presentation forward by one slide, and rotating the hand once anticlockwise may move the presentation backward by one slide. Further, rotating the hand continuously in either direction will continue to move the presentation further in the corresponding direction. Also, the speed of moving the presentation forward or backward can be varied by varying the speed of rotating the hand.

Figure 38A:
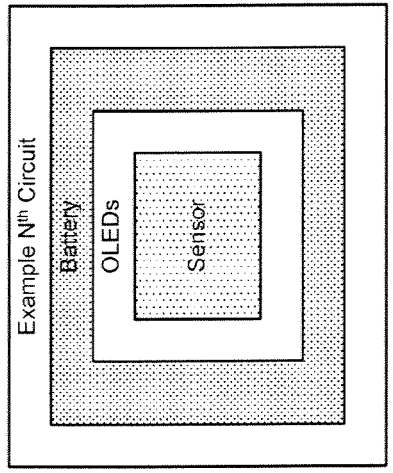
FIGS. 38A-38D depict examples of layouts of a circuit of a bracelet.
Figure 38B:
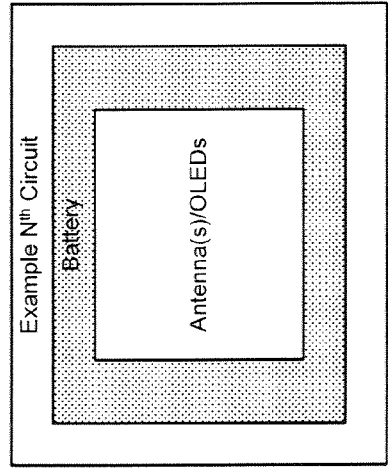
Figure 38C:
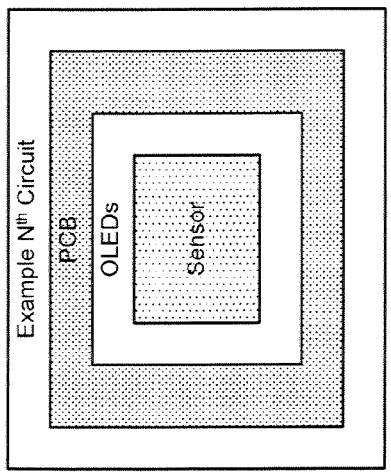
Figure 38D:
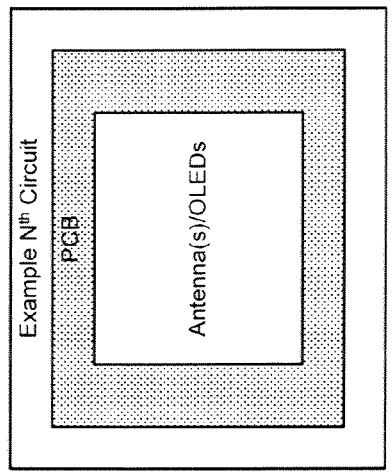

Referring now to FIGS. 38A-38D, examples of layouts of the $N^{th}$ circuit are shown. In these examples, the printed circuit board (PCB) may include, for example, the male connector 250, the interface circuit 252, the processing circuit 254, the interface circuit 256, and the female connector 258 shown in FIG. 36B. In FIG. 38A, the $N^{th}$ circuit can include a sensor (e.g., a capacitive sensor or any of the sensors 262) and the OLEDs 260. In FIG. 38B, the $N^{th}$ circuit can include a sensor (e.g., a capacitive sensor or any of the sensors 262), the OLEDs 260, and a power supply circuit including a battery. In FIG. 38C, the $N^{th}$ circuit can include the OLEDs 36U and one or more antennas (e.g., a BT antenna, a WiFi antenna, or a single BT/WiFi antenna). In FIG. 38D, the $N^{th}$ circuit can include the OLEDs 260, one or more antennas (e.g., a BT antenna, a WiFi antenna, or a single BT/WiFi antenna), and a power supply circuit including a battery. Many other combinations are contemplated.

Figure 39A:
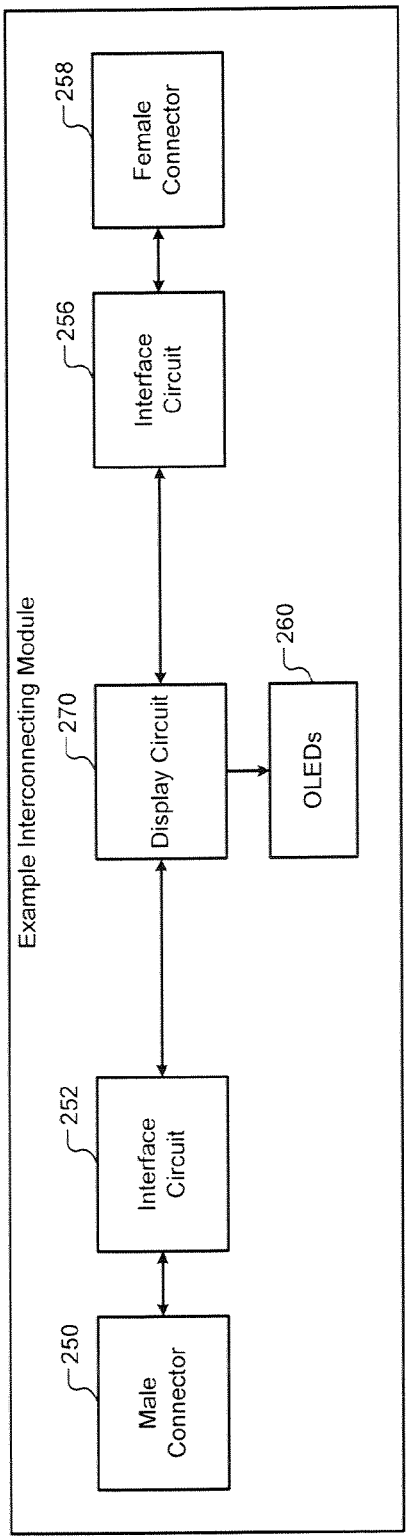
FIGS. 39A and 39B are functional block diagrams of examples of interconnecting modules associated with one implementation of a bracelet.
Figure 39B:
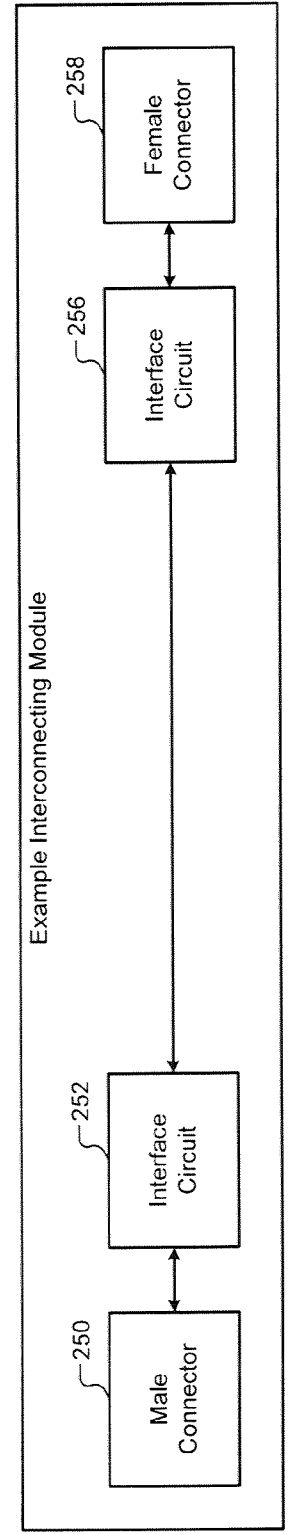

Referring now to FIGS. 39A and 39B, examples of the interconnecting module 204 are shown. In FIG. 39A, the interconnecting module 204 may include the male connector 250, the interface circuit 252, the processing circuit 254, the interface circuit 256, the female connector 258, the OLEDs 260, and a display circuit 270 to control the OLEDs 260. Additionally, the interconnecting module 204 may include one or more of the sensors 262 and corresponding processing circuit. In FIG. 39B, the interconnecting module 204 may include only the male connector 250, the interface circuit 252, the processing circuit 254, the interface circuit 256, and the female connector 258.

Figure 40A:
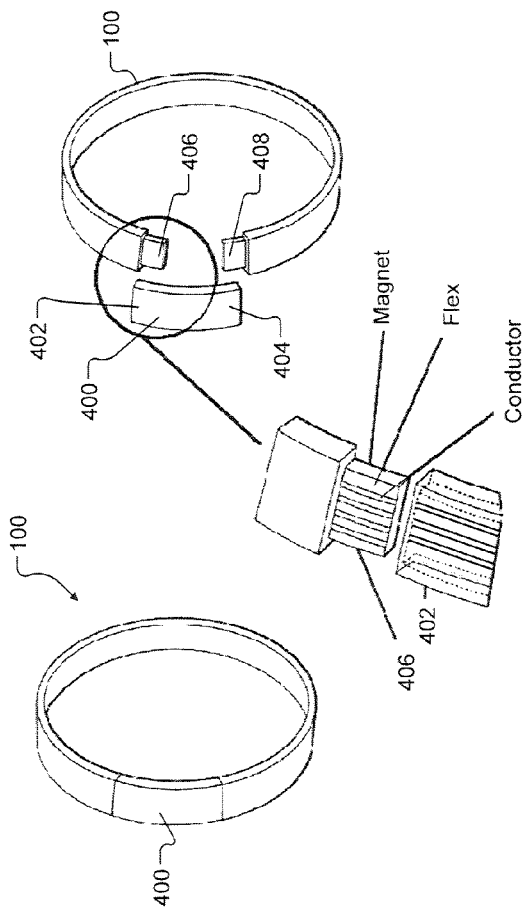
FIG. 40 depicts a locking module of a bracelet.
FIG. 40B is a functional block diagram of the locking module of FIG. 40.
FIG. 40C is a functional block diagram of a first module of a bracelet that connects to a locking module.
FIG. 40D is a functional block diagram of a last module of a bracelet that connects to a locking module.

Referring now to FIGS. 40A-40D, an example of a locking module 400 is shown. In FIG. 40A, the locking module 400 locks into two ends of the bracelet 100 as shown. The locking module 400 has a first end 402 and a second end 404. The bracelet 100 has a first end 406 and a second end 408. The first end 406 of the bracelet 100 is male type and includes a magnet and a flex cable including conductors for power and data lines. The second end 408 of the bracelet 100 is also male type and includes a magnet but no power and data connections.

The first end 402 of the locking module 400 is female type and includes power and data connections corresponding to the first end 406 of the bracelet 100. The second end 404 of the locking module 400 is also female type and does not include power and data connections. Accordingly, the magnet of the second end 408 of the bracelet 100 can be stronger than the magnet of the first end 406 of the bracelet.

In FIG. 40B, a functional block diagram of the locking module 400 is shown. When the bracelet 100 is modular, the locking module 400 is shown connected to a first module 200-1 and a last module 220-1 of the bracelet 100. The locking module 400 includes a female connector 450, the interface circuit 252, and a female socket 452. The locking module 400 can include the OLEDs 260 and/or a sensor (e.g., a capacitive sensor or any of the sensors 262) and corresponding processing circuits. If the locking module 400 includes any of the OLEDs 260 and/or the sensors 262 and corresponding processing circuits, the locking module 400 also includes the interface circuit 256 to provide terminations to the transmission lines carrying power and data.

Figure 40D:
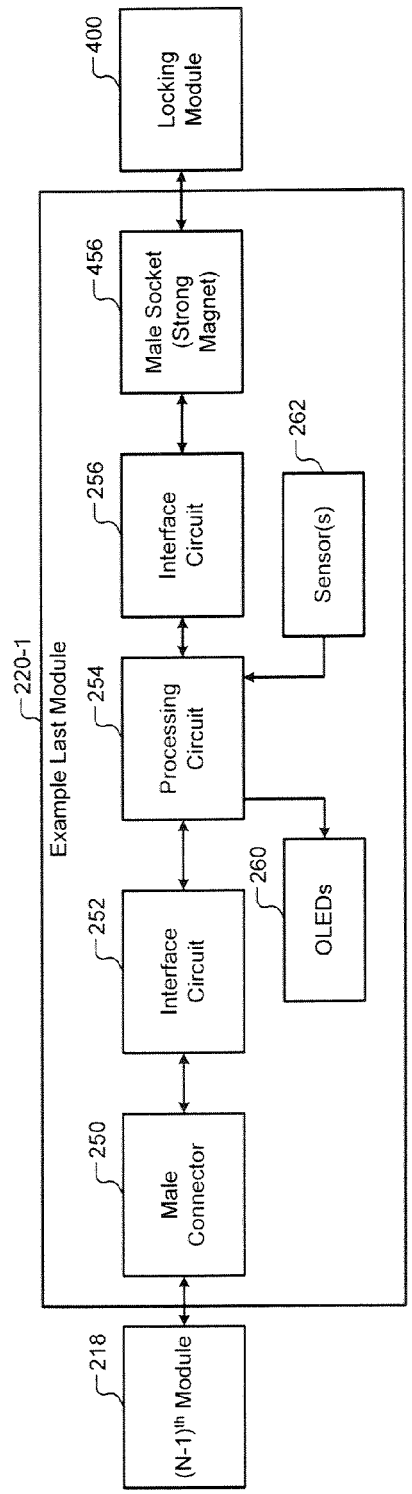

The locking module 400 may not be used if the bracelet 100 is modular and is fully configured using many of the functional and interconnecting modules. Accordingly, the functional and interconnecting modules of the bracelet 100 may interconnect using the male and female connectors 250 and 258 shown in FIGS. 36B and 39A. When the locking module 400 is used, however, the first and last modules of the bracelet 100 may have different ends as shown in FIG. 40A and therefore may have different connectors as shown in FIGS. 40C and 40D.

For example, in FIG. 40C, the first module 200-1 of the bracelet 100 may include a male connector 454 that is magnetic and that plugs into the first end 402 of the locking module 400 as shown in FIG. 40A. In FIG. 40D, the last module 220-1 of the bracelet 100 may also include a male connector 456 that is magnetic and that plugs into the second end 404 of the locking module 400 as shown in FIG. 40A. The magnet of the male connector 456 of the last module 220-1 of the bracelet 100 may be stronger than the magnet of the male connector 454 of the first module 200-1 of the bracelet 100.

Figure 41A:
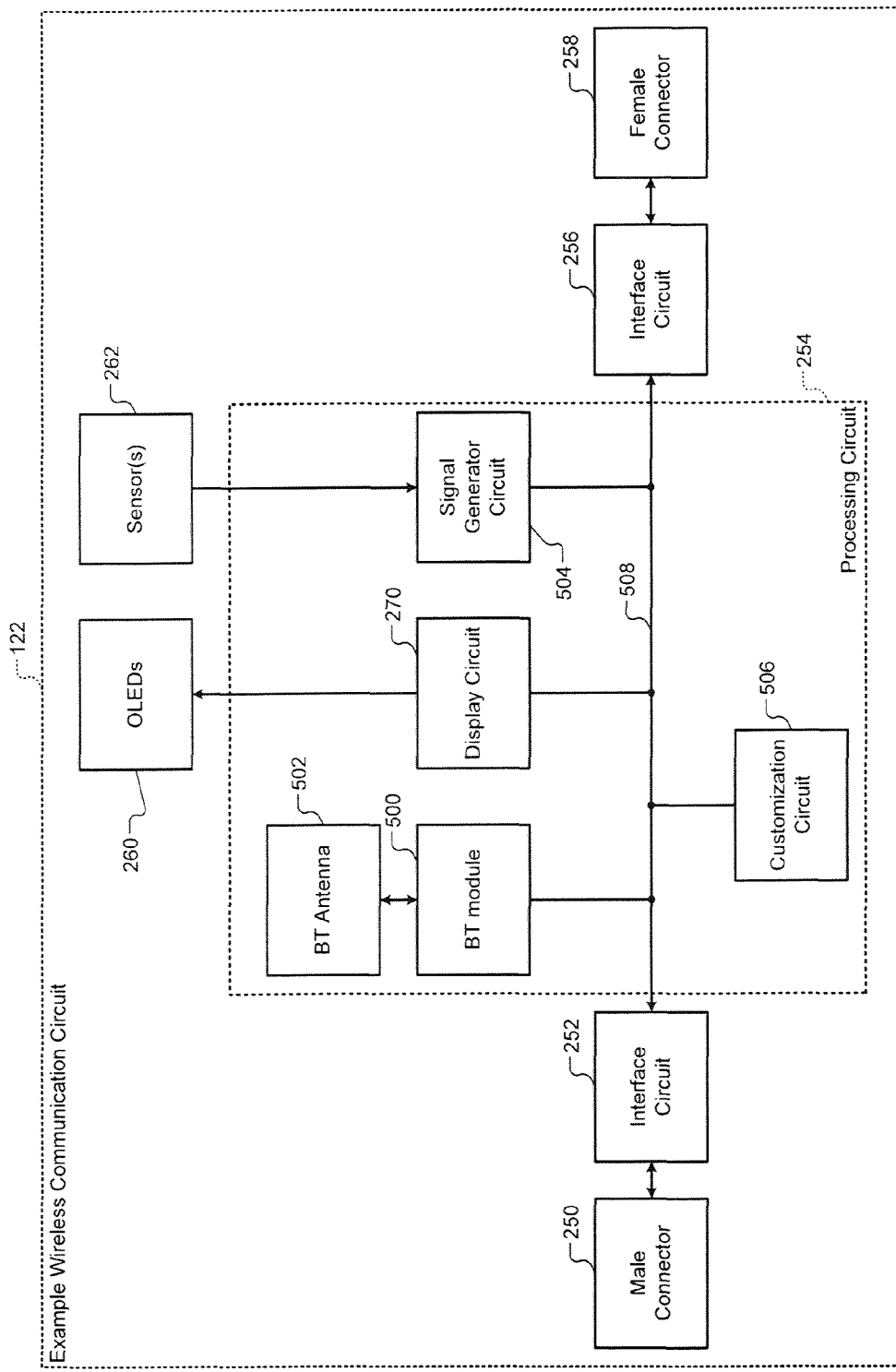
FIG. 41A is an example of a functional block diagram of a wireless communication circuit of a bracelet.

Referring now to FIGS. 41A-41E, detailed functional block diagrams of various example circuits of the bracelet 100 are shown. In FIG. 41A, an example wireless communication circuit 122 is shown. The wireless communication circuit 122 includes the male connector 250, the interface circuit 252, the processing circuit 254, the interface circuit 256, and the female connector 258. The wireless communication circuit 122 may additionally include the OLEDs 260 and one or more of the sensors 262. Accordingly, the processing circuit 254 may include a BT circuit 500, a BT antenna 502, the display circuit 270, a signal generator circuit 504, and a customization circuit 506. The circuits in the processing circuit 254 communicate with a bus 508 that includes the power and data transmission lines.

The BT circuit 500 communicates with the smartphone 102 or any other BT device via the BT antenna 502. The BT circuit 500 may receive an application from the smartphone 102 or a device (e.g., a laptop). The customization circuit 506 customizes the application according to the configuration of the wireless communication circuit 122. For example, if the application includes features used to display information, but the wireless communication circuit 122 does not include the OLEDs 260, the customization circuit 506 disables the display features of the application. As another example, if the application includes features used to output sounds, and the wireless communication circuit 122 includes a speaker, the customization circuit 506 enables the sound features of the application.

The signal generator circuit 504 generates signals based on conditions sensed by the sensors 262. The signals are transmitted to other circuits of the wireless communication circuit 122 via the bus 508. For example, if one of the sensors 262 senses a condition that requires dimming the OLEDs 260 or displaying a pattern on the OLEDs 260, the signal generator circuit 504 generates a signal and outputs the signal to the bus 508. If the wireless communication circuit 122 includes the OLEDs 260, the signal is communicated to the display circuit 270 to control the OLEDs 260. Alternatively or additionally, the signal is communicated to other circuits of the bracelet 100 so that the OLEDs 260 of the other circuits of the bracelet 100 can be controlled.

The OLEDs 260 can also be controlled based on a downloaded application. For example, stock prices received from the smartphone 102 via the BT circuit 500 can be displayed on the OLEDs 260 all around the bracelet 100 based on the application. The application may run wholly on the smartphone 102, wholly on the bracelet 100, or partly on the smartphone 102 and partly on the bracelet 100. As other examples, pictures, patterns, time, holograms, and other types of data may be displayed on the OLEDs 260 all around the bracelet 100 based on different applications. A combination of the sensors 262 and applications may be used to control the OLEDs 260.

A capacitive sensor included in the sensors 262 can be used to configure the wireless communication circuit 122 or other circuits of the bracelet 100. For example, the user can execute an application on the smartphone 102 and use the capacitive sensor on the wireless communication circuit 122 to determine whether the OLEDs 260 on the wireless communication circuit 122 will display a portion of time (e.g., hours or minutes).

The capacitive sensors and the OLEDs 260 on the circuits of the bracelet 100 can provide a keypad with which to configure an application and/or functions of the bracelet. For example, characters/shapes displayed on the circuits of the bracelet 100 can be selected by touching the capacitive sensors on the circuits to lock/unlock the bracelet 100 as explained below.

Additionally or alternatively, the capacitive sensor (or another sensor) may be used to send a signal, for example, via the BT antenna 502, via one of the OLEDs 260, or via a speaker in one of the circuits of the bracelet 100, to a device to control the device (e.g., turn on or turn off the device).

Further, the signals generated by the signal generator circuit 504 can be transmitted to another circuit of the bracelet 100 comprising a speaker, which can sound an alarm based on a condition sensed by one of the sensors 262. The signals generated by the signal generator circuit 504 can also be used to control other devices by generating signals such as infrared signals using suitable signal generators in one or more circuits of the bracelet 100.

Figure 41B:
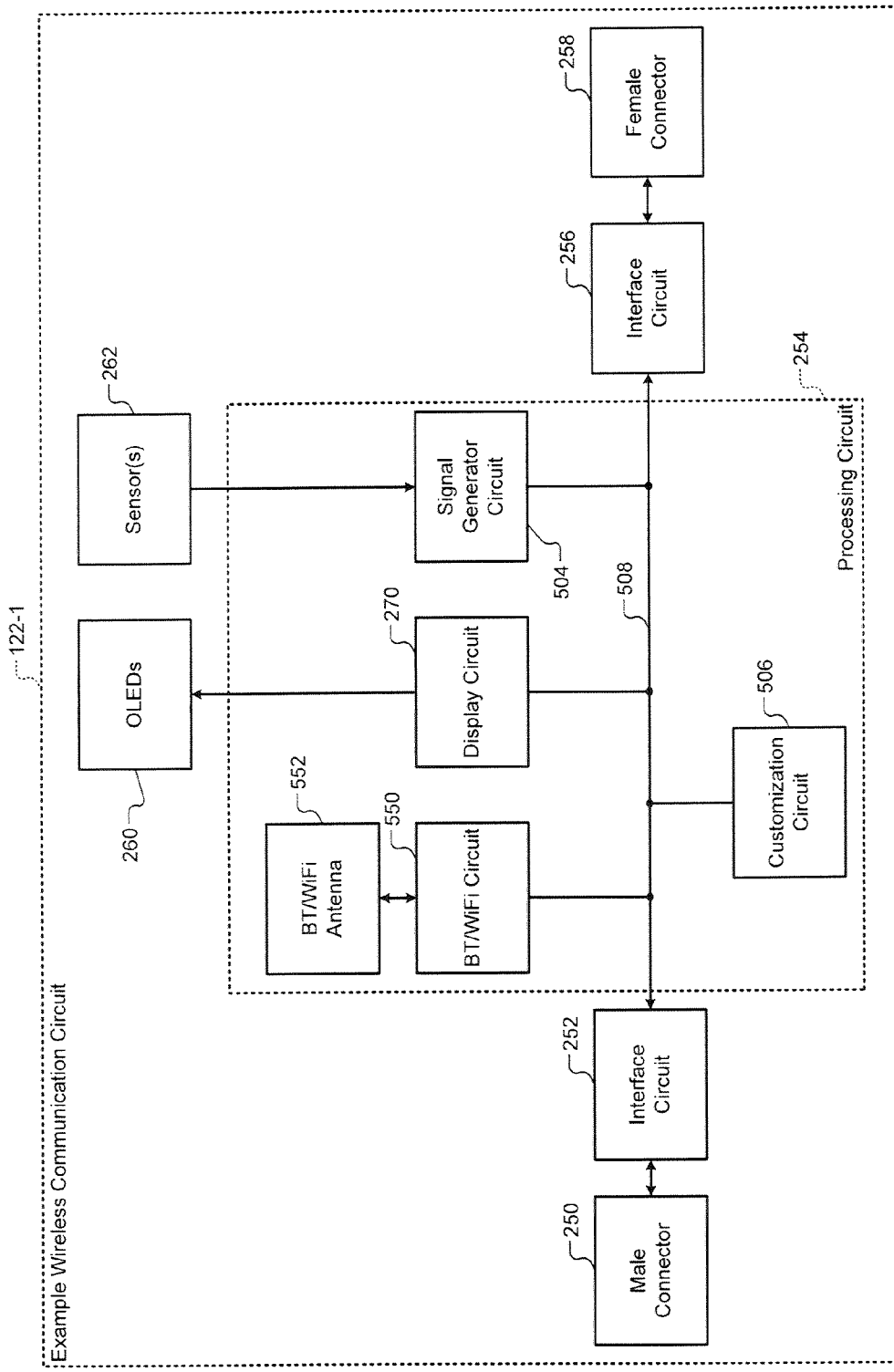
FIG. 41B is an example of a functional block diagram of a wireless communication circuit of a bracelet.
Figure 41C:
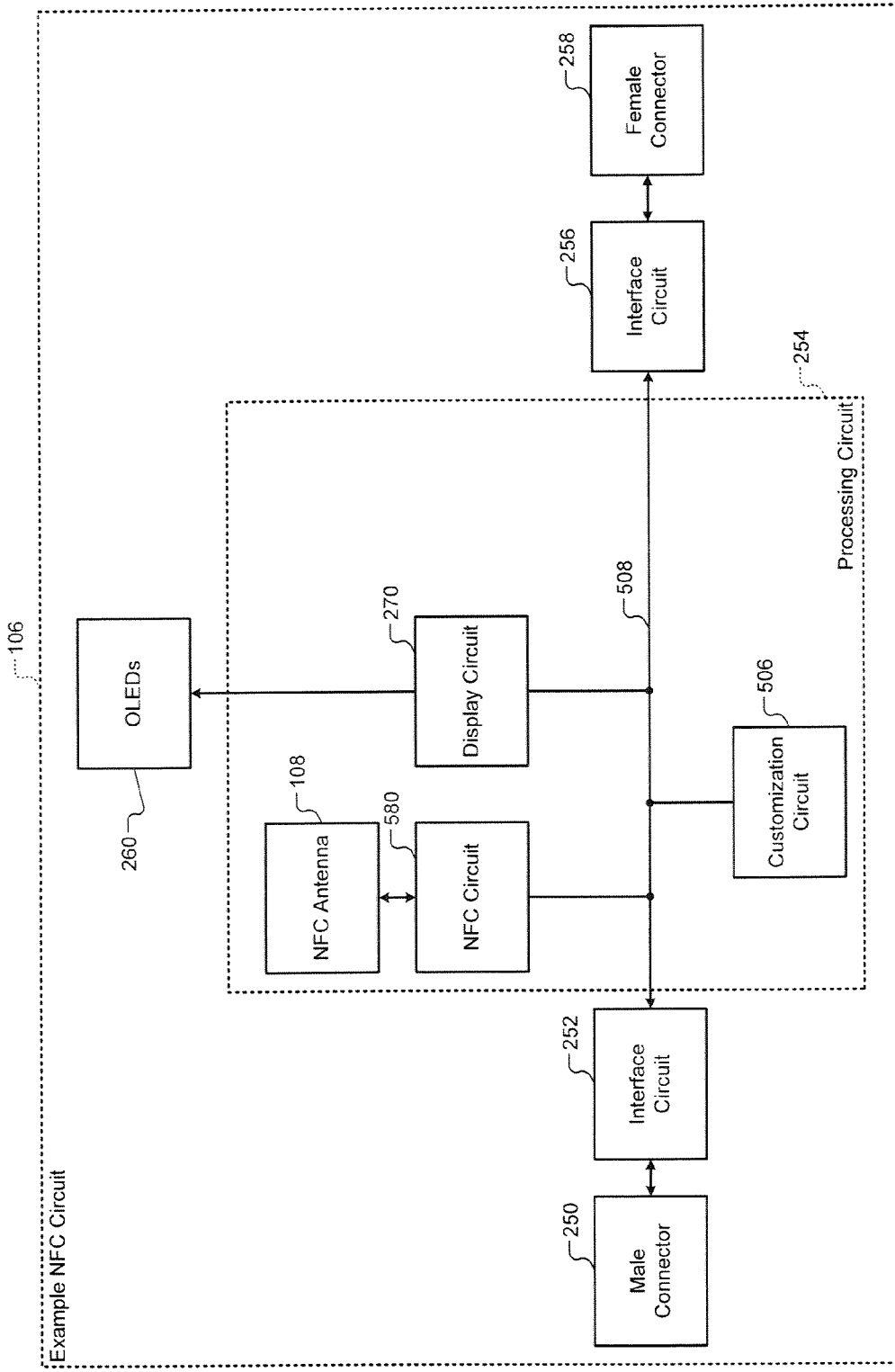
FIG. 41C is an example of a functional block diagram of a near-field communication circuit of a bracelet.

In FIG. 41B, another example of a wireless communication circuit 122-1 is shown. The wireless communication circuit 122-1 includes a BT/WiFi circuit 550 and a BT/WiFi antenna 552 in addition to other circuits shown and already described. Functions of other circuits of the bracelet 100 may be similarly combined in a single circuit. In FIG. 41C, an example of the NFC circuit 106 is shown. The NFC circuit 106 includes a NFC processing circuit 580 and the NEC antenna 108 in addition to other circuits shown and already described.

Figure 41D:
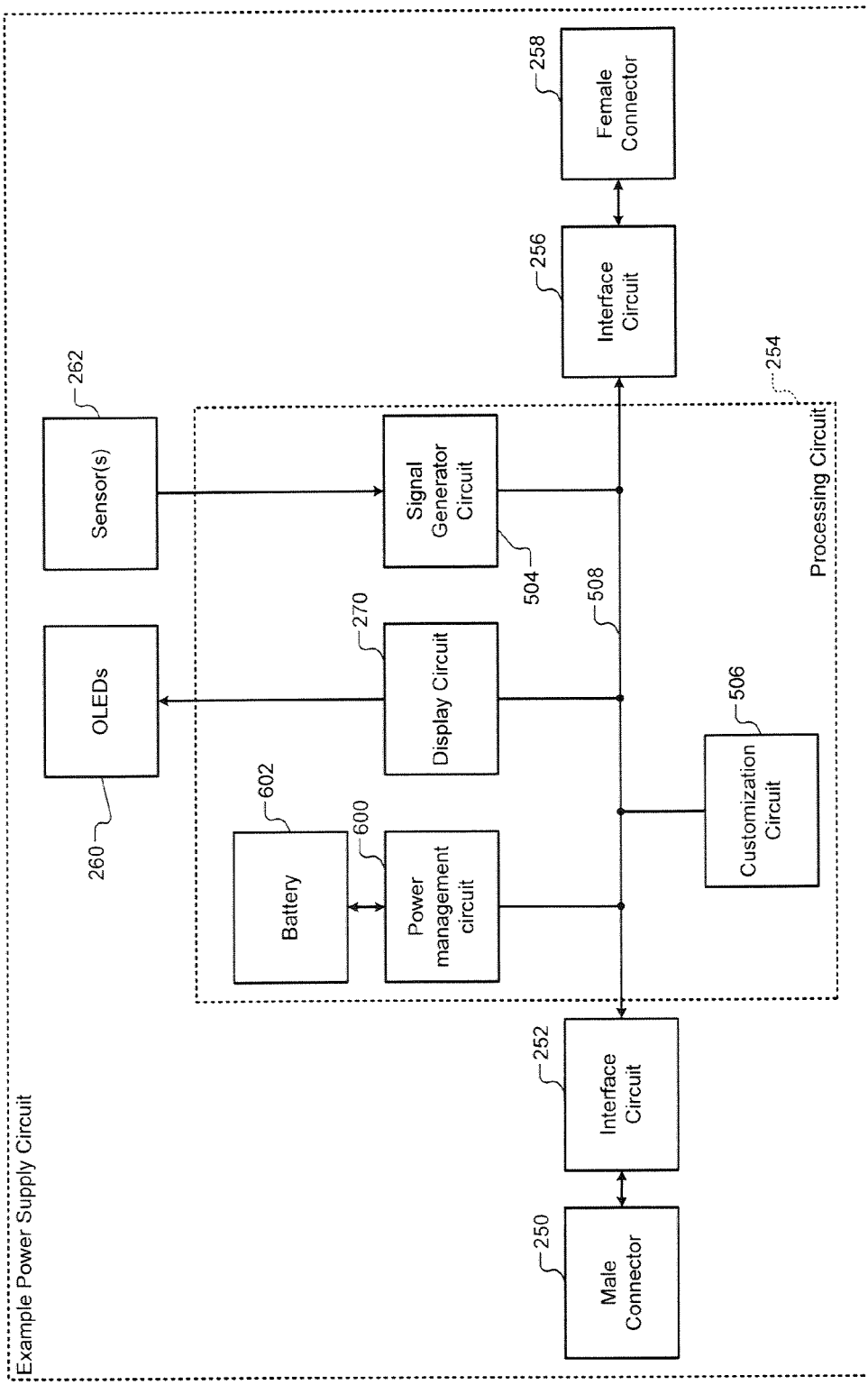
FIG. 41D is an example of a functional block diagram of a power supply circuit of a bracelet.

In FIG. 41D, an example of a power supply circuit (e.g., the first power supply circuit 110) is shown. The power supply circuit may include a power management circuit 600 and a battery 602 in addition to other circuits shown and already described. The power management circuit 600 controls the charging of the battery battery 602 and supply of power from the battery 602 to the circuits of the bracelet 100.

For example, the power management circuit 600 charges the battery 602 based on the power received by the NEC circuit 106 via the NFC antenna 108 from a power source through inductive coupling. Alternatively, when the bracelet 100 is modular, the power management circuit 600 charges the battery 602 based on power received by one of the circuits of the bracelet 100 connected to an external power source via a powering module and a cable.

The power management circuit 600 supplies power from the battery 602 to the circuits of the bracelet 100 based on signals received from the signal generator circuit 504. For example, based on conditions sensed by one or more of the sensors 262, the signal generator circuit 504 may generate signals to turn on, turn off, brighten, or dim the OLEDs 260 wholly or partly in one or more circuits of the bracelet 100.

The power management circuit 600 can also shutdown (i.e., turn off power or supply less than normal power to) one or more circuits of the bracelet 100. This feature can be controlled from the smartphone 102 via an application that the user can customize according to the configuration of the bracelet 100. The application then communicates with the power management circuit 600 via a BT link between the smartphone 102 and the bracelet 100. The power management circuit 600 accordingly activates or deactivates one or more circuits of the bracelet 100 wholly or partly.

For example, the OLEDs 260 may be turned off if the light sensor detects that a shirt sleeve is covering the bracelet 100. However, the NFC circuit 106 may be still active (i.e., turned on) so that a transaction requiring the authentication information via the NFC circuit 106 can still be performed. As another example, while the OLEDs 260 may be turned off at night, the OLEDs 260 may be turned on at a party in spite of dark surroundings sensed by the light sensor. Further, a graphic pattern in fashion, making a statement, and/or matching the attire and/or mood of the user may be displayed.

Figure 41E:
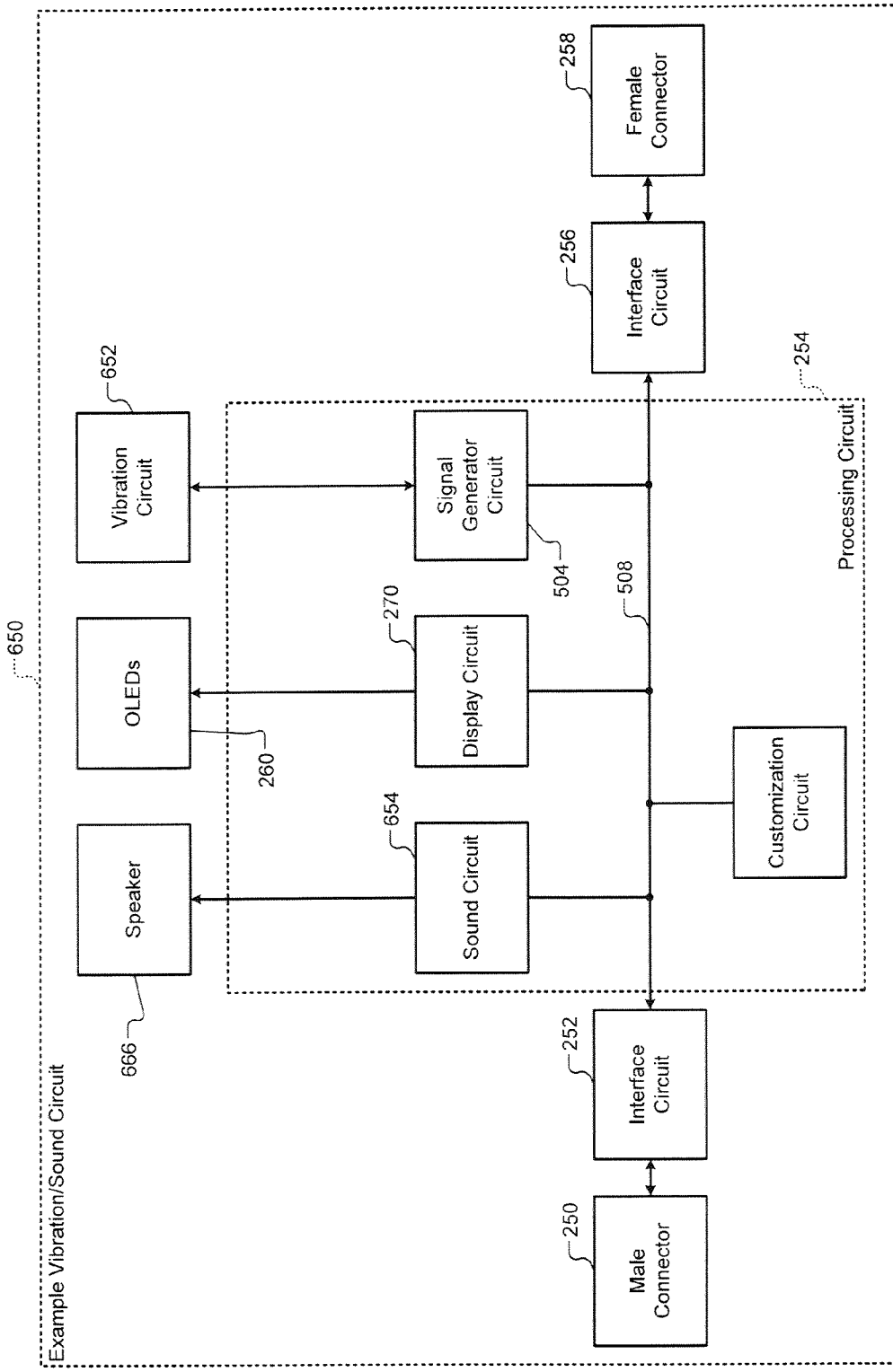
FIG. 41E is an example of a functional block diagram of a vibration and sound circuit of a bracelet.

In FIG. 41E, an example of a vibration/sound circuit 650 for the bracelet 100 is shown. The vibration/sound circuit 650 may include a vibration circuit 652, a sound circuit 654, and a speaker 666 in addition to other circuits shown and already described. The vibration circuit 652 may include a piezoelectric crystal that can vibrate based on a signal generated by the signal generator circuit 504.

For example, the BT circuit 500 of the wireless communication circuit 122 shown in FIG. 41A may sense when the smartphone 102 receives a call or a voice/text message and when the smartphone 102 is set to vibrate mode. Based on the sensing, the signal generator circuit 504 of the wireless communication circuit 122 or the vibration/sound circuit 650 may generate a signal. The signal can cause the vibration circuit 652 to vibrate the bracelet 100. Alternatively or additionally, the signal can cause the OLEDs 260 on one or more circuits of the bracelet 100 to flash. Alternatively or additionally, the signal may generate sounds through the speaker 666.

The sound circuit 654 can generate sounds through the speaker 666 in response to signals received from one or more of the sensors 262 and/or based on a downloaded multimedia application. The sound circuit 654 can also generate sounds through the speaker 666 at predetermined times (e.g., as in wakeup alarms or when a biometric condition (e.g., a heart attack) occurs).

The bracelet 100 includes security features to protect against loss or theft. For example, the bracelet 100 can be locked and unlocked using a password. The password may include any alphanumeric characters, shapes, colors, or combinations therefore displayed on the OLEDs 260. The user may enter the password by touching the capacitive sensors on the circuits of the bracelet 100 on which the characters of the password are displayed. The positions of the characters of the password on the bracelet 100 can be changed after each use.

For example, a password having four characters C1, C2, C3, and C4 may be initially displayed on the OLEDs 260 of the first, second, third, and fourth circuits, respectively, of the bracelet 100. After the user has entered the password once, when the password needs to be entered next time, the characters of the password may be displayed in different positions (i.e., different circuits) on the bracelet 100. For example, the characters C2, C4, C1, C3 may be displayed on the OLEDs 260 on the first, second, third, and fourth circuits of the bracelet 100, respectively. Alternatively, the characters C1, C2, C3, and C4 may be displayed on the OLEDs 260 on the fifth, second, seventh, and first circuits of the bracelet 100, respectively.

Figure 42C:
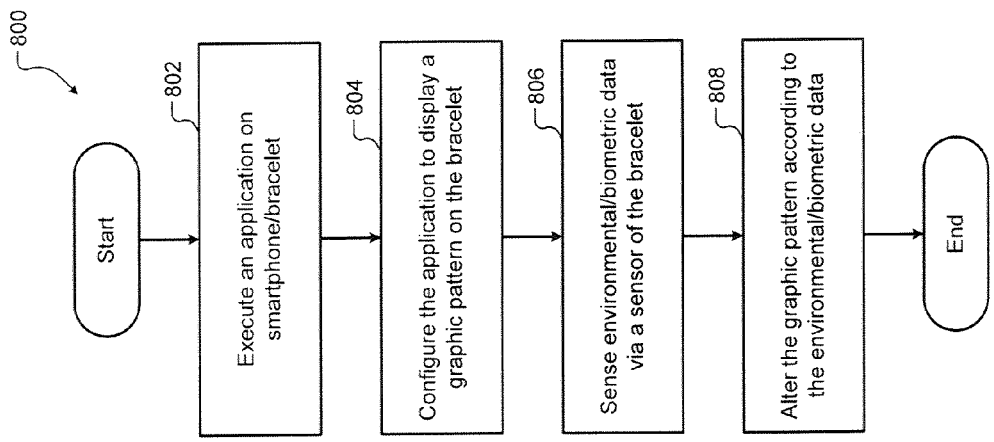
FIGS. 42A-42E are flowcharts of methods operable to be performed by a bracelet.
Figure 42B:
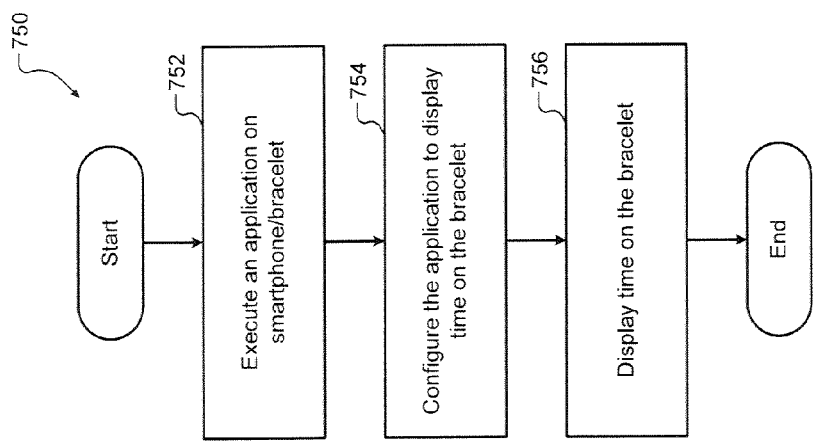
Figure 42A:
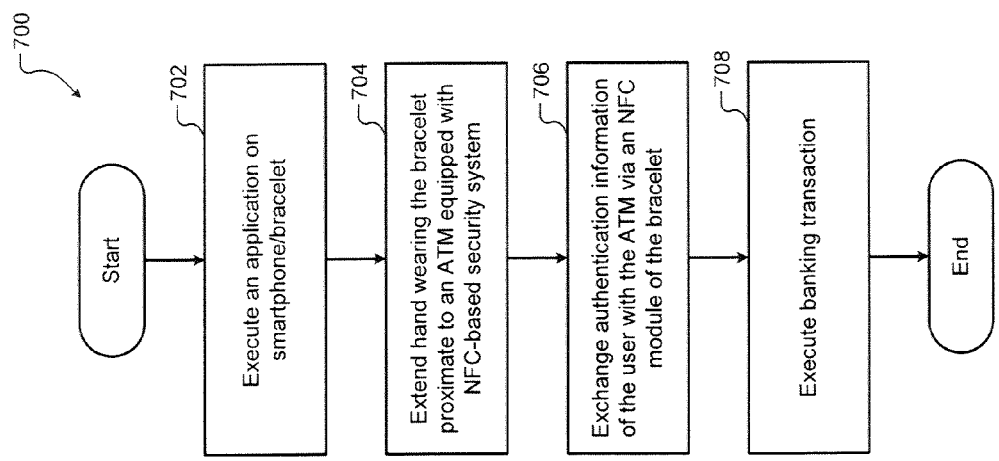

Referring now to FIGS. 42A-42E, various methods performed by the bracelet 100 are shown. In FIG. 42A, a method 700 performed by the bracelet for exchanging authentication information via a NFC antenna is shown. At 702, the user executes an application (e.g., a banking application) on the smartphone and/or the bracelet. At 704, the user extends the hand wearing the bracelet proximate to an NFC-based security system such as an automated teller machine (ATM). At 706, the bracelet exchanges the authentication information of the user via the NFC antenna of the bracelet. At 708, after the security system verifies the authentication information, the user executes a transaction securely with the NFC-based security system.

In FIG. 42B, a method 750 performed by the bracelet for displaying time on the bracelet is shown. At 752, the user executes an application on the smartphone and/or the bracelet. At 754, the user configures the application to display time on the bracelet. For example, time can be displayed in different ways described above. Depending on the way selected by the user, the application configures the display circuits of the bracelet to display different portions of the time. At 756, the different circuits of the bracelet display the time according to the selection made by the user.

In FIG. 42C, a method 800 performed by the bracelet for displaying different graphic patterns on the bracelet is shown. At 802, the user executes an application on the smartphone and/or the bracelet. At 804, the user configures the application to display a graphic pattern on the bracelet. At 806, a sensor of the bracelet senses environmental or biometric data. At 808, the circuits of the bracelet alter the graphic pattern according to the environmental or biometric data.

Figure 42D:
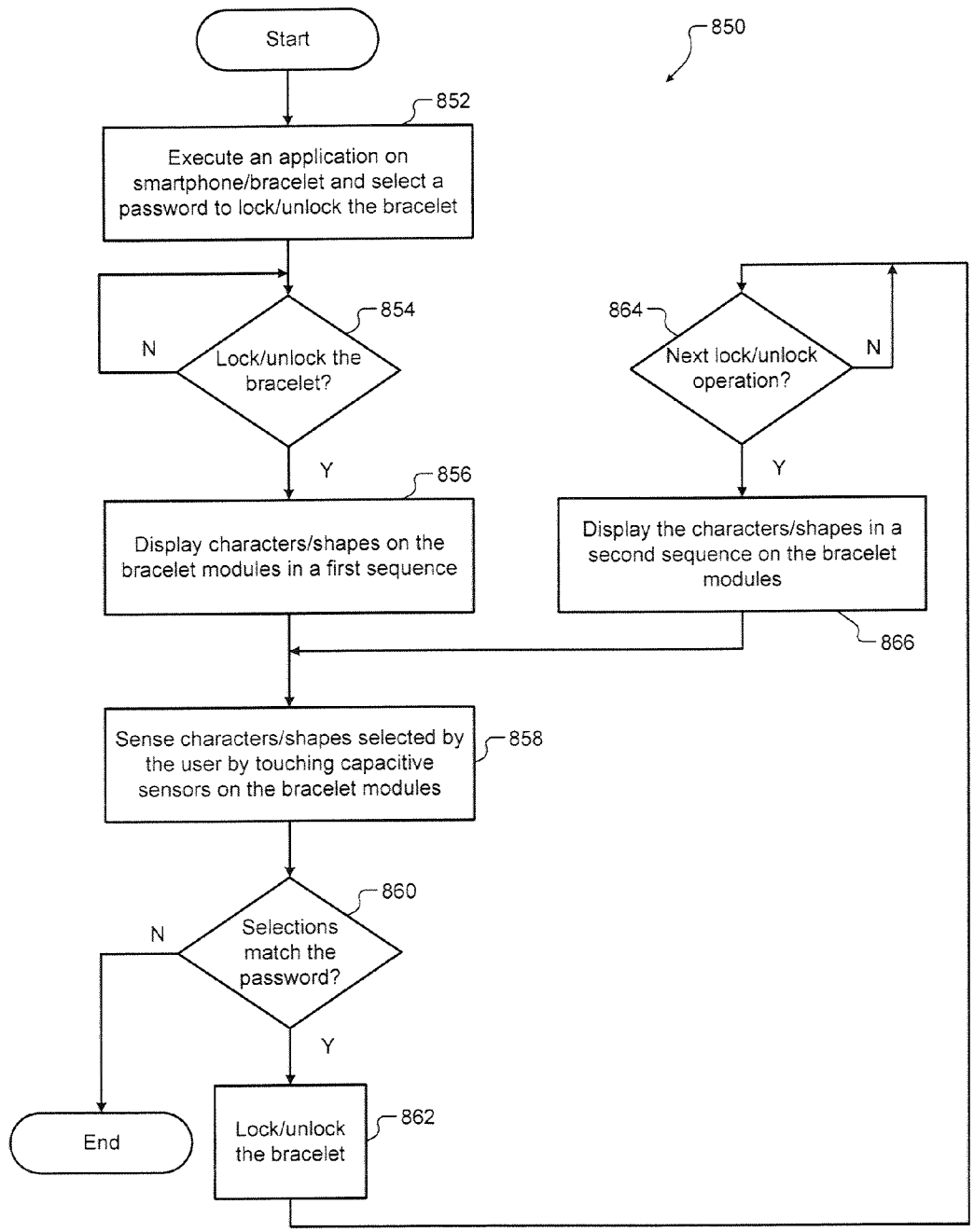

In FIG. 42D, a method 850 performed by the bracelet for locking/unlocking the bracelet is shown. At 852, the user executes an application on the smartphone and/or the bracelet and selects a password to lock/unlock the bracelet. At 854, the user determines whether to lock/unlock the bracelet. At 856, if the bracelet is to be locked/unlocked, the application displays characters/shapes on the bracelet in a first sequence. At 858, the application senses characters/shapes selected by the user by touching capacitive sensors on the bracelet circuits. At 860, the application determines if the selections made by the user match the password. The method 850 ends if the password does not match. At 862, the bracelet is locked/unlocked if the password matches.

At 864, the user determines whether to lock/unlock the bracelet. For example, the bracelet may be locked if no operation is performed for a predetermined time and may need to be unlocked before performing an operation. At 866, if the bracelet is to be locked/unlocked, the application displays characters/shapes on the bracelet in a second sequence as described above. At 858-862, the bracelet is locked/unlocked according to results obtained at 858-862.

Figure 42E:
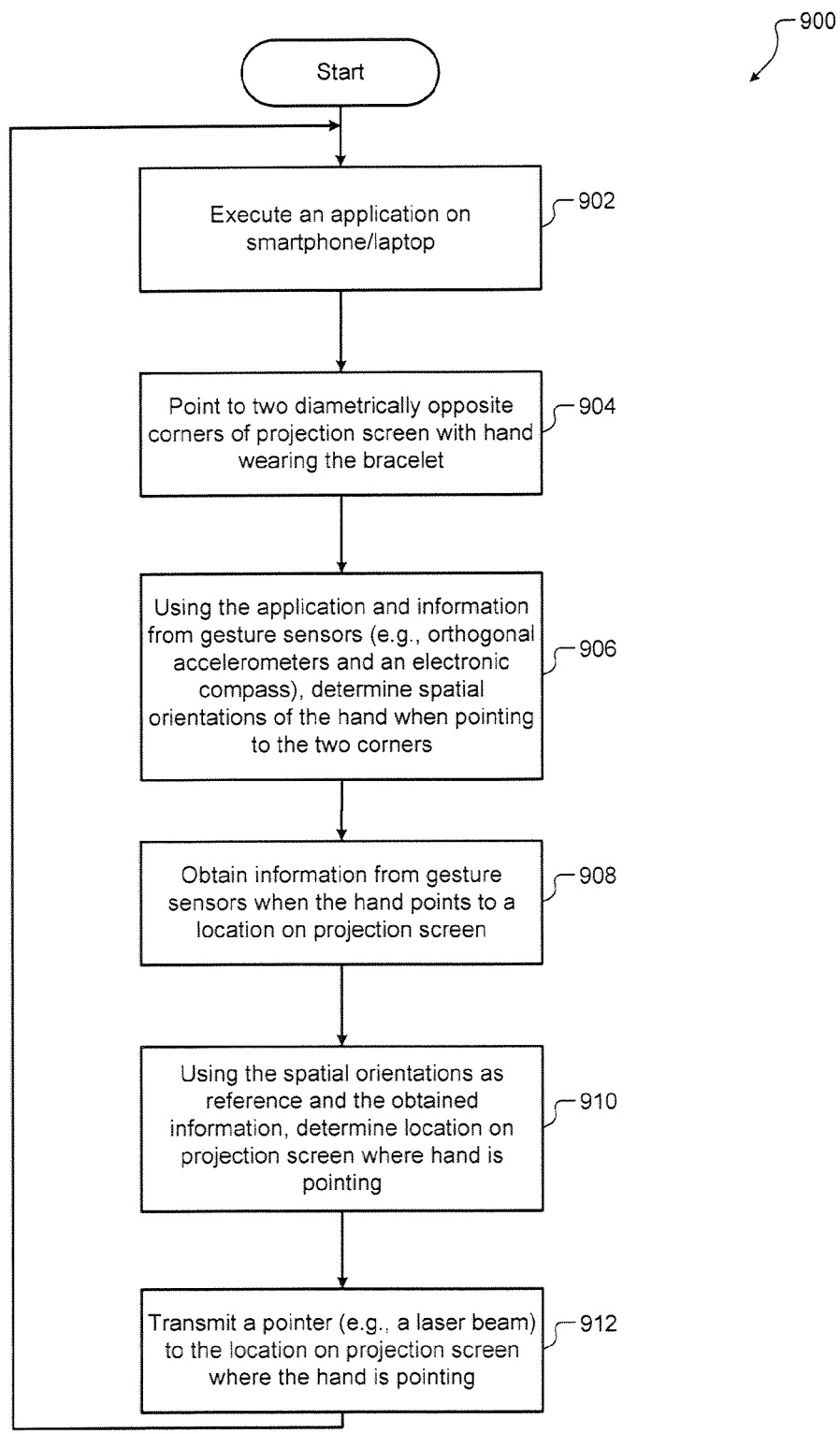

In FIG. 42E, a method 900 performed by the bracelet for sensing gestures made by the hand wearing the bracelet is shown. In the example used to explain the method, the user makes a power-point presentation using a laptop. Similar methods may be used in other applications.

At 902, the user executes an application on the smartphone and/or the laptop. At 904, using the hand wearing the bracelet, the user points to two diametrically opposite corners of the projection screen on which the power-point slides are projected. At 906, using the application and spatial information provided by gesture sensors of the bracelet, the application determines the spatial orientations of the hand when pointing to the two corners. At 908, the application obtains spatial information from the gesture sensors as the hand points to a location on the projection screen. At 910, using the spatial orientations as a reference and the obtained spatial information corresponding to the pointed location, the application determines the location on the projection screen where the hand is pointing. At 912, one of the circuits of the bracelet transmits a pointer such as a laser beam to the pointed location on the projection screen.

Thus, the user can use the bracelet as a pointing device and freely point to any location on the projection screen. The user can further rotate the hand in two opposite directions and/or snap fingers to move the presentation forward and backward. Using similar methods, the user can use the bracelet as a remote control.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A bracelet configured to assist a second device in performing a near-field communication (NFC) transaction with a near-field communication (NFC) device, the bracelet comprising:
a near-field communication (NFC) circuit configured to, in response to the bracelet being placed proximate to the near-field communication (NFC) device, exchange data related to the near-field communication (NFC) transaction with the near-field communication (NFC) device;
a wireless communication circuit configured to wirelessly communicate the data related to the near-field communication (NFC) transaction to the second device;
a power supply circuit configured to supply power to one or more of the near-field communication (NFC) circuit and the wireless communication circuit,
wherein the near-field communication (NFC) circuit is configured to transmit, to the near-field communication (NFC) device, authentication information to authenticate the near-field communication (NFC) transaction, wherein the authentication information includes unique information included in a subscriber identity circuit of the second device, and
wherein the bracelet is configured to (i) operate as a companion device of the second device, and (ii) use the unique information included in the subscriber identity circuit of the second device to communicate with the near-field communication (NFC) device;
a plurality of display devices arranged along an outer surface of the bracelet; and
a display circuit configured to display data on the plurality of display devices, wherein each of the plurality of display devices comprises a capacitive sensor configured to generate an output in response to touch;
wherein the display circuit is configured to display, on the plurality of display devices, i) a first set of characters at a first time, and ii) a second set of characters at a second time;
wherein the first set of characters includes at least one of letters, numerals, symbols, shapes, and colors;
wherein the second set of characters includes a rearrangement of the first set of characters; and
wherein the second time corresponds to one or more of the capacitive sensors on the plurality of display devices having sensed touch within a predetermined time.

2. The bracelet of claim 1, wherein the second device is a smartphone, a tablet, or a personal computer.

3. The bracelet of claim 1, wherein:
the near-field communication (NFC) circuit includes a first antenna;
the wireless communication circuit includes a second antenna;
the power supply circuit includes a battery; and
the first antenna, the second antenna, and the battery are distributed throughout the bracelet.

4. The bracelet of claim 1, wherein:
the second device has more processing power and storage capability than the bracelet; and
the bracelet is configured to off-load, to the second device, operations requiring the processing power and storage capability of the second device.

5. The bracelet of claim 1, wherein:
the near-field communication (NFC) circuit includes a first antenna, and the near-field communication (NFC) circuit is configured to receive power from a power source via the first antenna, and
the power supply circuit includes a battery, and the power supply circuit is configured to charge the battery using the power received by the near-field communication (NFC) circuit via the first antenna.

6. The bracelet of claim 1, wherein:
in response to a first user of the bracelet shaking hands with a second user of a second bracelet, the near-field communication (NFC) circuit is configured to
transmit identification information of the first user to the second bracelet, and
receive identification information of the second user from the second bracelet.

7. The bracelet of claim 1, further comprising:
a sensor to sense movement of a portion of an arm of a user wearing the bracelet, wherein the sensor includes at least one of an accelerometer, a gyroscope, an electronic compass, and a microphone; and
a signal generator circuit configured to generate a signal in response to the movement to control a function of (i) the second device or (ii) at least one of the wireless communication circuit, the near-field communication (NFC) circuit, and the power supply circuit.

8. The bracelet of claim 7, wherein at least one of the wireless communication circuit, the near-field communication (NFC) circuit, and the power supply circuit includes the sensor and the signal generator circuit.

9. The bracelet of claim 1, further comprising:
a capacitive sensor configured to generate an output in response to touch; and
a signal generator circuit configured to generate a signal in response to the output of the capacitive sensor to control a function of (i) the second device or (ii) at least one of the wireless communication circuit, the near-field communication (NFC) circuit, and the power supply circuit.

10. The bracelet of claim 1, wherein the bracelet is configured to be locked or unlocked based on a user touching a predetermined sequence of one or more of the first set of characters displayed on the bracelet.

11. The bracelet of claim 1, further comprising:
a sensor configured to sense environmental data related to environment surrounding the bracelet,
wherein the sensor includes one or more of a light sensor and a microphone, and
wherein the display circuit is configured to turn off or turn on at least a portion of the plurality of display devices according to the environmental data sensed by the light sensor or the microphone.

12. The bracelet of claim 1, further comprising:
a sensor configured to sense biometric data of a user of the bracelet,
wherein the sensor includes one or more of a temperature sensor, a blood-pressure sensor, and a pulse sensor, and
wherein the display circuit is configured to turn off or turn on at least a portion of the plurality of display devices according to the biometric data sensed by the temperature sensor, the blood-pressure sensor, or the pulse sensor.

13. The bracelet of claim 1, further comprising:
a sensor to sense movement of a portion of an arm of a user wearing the bracelet, wherein the sensor includes one or more of an accelerometer, a gyroscope, an electronic compass, and a microphone, wherein the display circuit is configured to turn off or turn on the display devices according to the movement sensed by the accelerometer, the gyroscope, the electronic compass, or the microphone.

14. The bracelet of claim 1, further comprising a second power supply circuit configured to supply power to one or more of the near-field communication (NFC) circuit and the wireless communication circuit.

15. The bracelet of claim 1, wherein:
the wireless communication circuit is configured to download an application from the second device; and
at least one of the near-field communication (NFC) circuit, the wireless communication circuit, and the power supply circuit is configured to operate based on the application downloaded from the second device.

16. The bracelet of claim 15, further comprising a customizing circuit configured to customize the application based on a configuration of the at least one of the near-field communication (NFC) circuit, the wireless communication circuit, and the power supply circuit.

17. The bracelet of claim 1, wherein the near-field communication (NFC) transaction comprises a near-field communication (NFC) payment transaction.

* * * * *